(12) United States Patent
Fujita et al.

(10) Patent No.: US 11,858,588 B2
(45) Date of Patent: Jan. 2, 2024

(54) REAR SPROCKET ASSEMBLY AND LOCK DEVICE

(71) Applicant: SHIMANO INC., Sakai (JP)

(72) Inventors: Hiroshi Fujita, Sakai (JP); Atsuhiro Emura, Sakai (JP)

(73) Assignee: SHIMANO INC., Sakai (JP)

( * ) Notice: Subject to any disclaimer, the term of this patent is extended or adjusted under 35 U.S.C. 154(b) by 319 days.

(21) Appl. No.: 17/402,625

(22) Filed: Aug. 16, 2021

(65) Prior Publication Data

US 2022/0348286 A1    Nov. 3, 2022

Related U.S. Application Data

(63) Continuation-in-part of application No. 17/244,862, filed on Apr. 29, 2021, now Pat. No. 11,603,166.

(51) Int. Cl.
*B62M 9/10*    (2006.01)

(52) U.S. Cl.
CPC ..................... *B62M 9/10* (2013.01)

(58) Field of Classification Search
CPC ............ B62M 9/10; B62M 9/12; F16D 41/30
USPC ......................................................... 474/160
See application file for complete search history.

(56) References Cited

U.S. PATENT DOCUMENTS

| | | | | |
|---|---|---|---|---|
| 3,900,088 A | * | 8/1975 | Ozaki ..................... | F16D 41/30 192/64 |
| 3,972,245 A | * | 8/1976 | Allen ...................... | B62M 9/10 192/64 |
| 4,102,215 A | * | 7/1978 | Nagano ................... | F16D 41/24 192/64 |
| 4,324,323 A | * | 4/1982 | Campagnolo ........... | F16D 41/30 192/64 |
| 4,472,163 A | * | 9/1984 | Bottini .................... | B62M 9/10 192/64 |
| 4,869,710 A | * | 9/1989 | Iwasaki ................... | F16D 41/30 474/160 |
| 5,194,051 A | * | 3/1993 | Nagano ................... | B62M 9/10 474/160 |
| 5,324,100 A | * | 6/1994 | James .................... | B60B 27/023 192/64 |
| 5,480,357 A | * | 1/1996 | Liang ...................... | B62M 9/10 474/160 |
| 5,503,600 A | * | 4/1996 | Berecz .................... | F16H 55/30 474/160 |
| 5,788,593 A | * | 8/1998 | Tiong ...................... | B62M 9/10 474/160 |

(Continued)

*Primary Examiner* — Henry Y Liu
(74) *Attorney, Agent, or Firm* — MORI & WARD, LLP

(57) ABSTRACT

A rear sprocket assembly comprises a first sprocket and a lock device. The lock device includes a first lock member and a second lock member. The first lock member includes a first axial end and a second axial end. The second lock member includes a third axial end and a fourth axial end. The third axial end is configured to be attached to the second axial end of the first lock member in an assembled state where the first sprocket and the lock device are assembled as one unit. The fourth axial end has at least one radial projection configured to abut against a first sprocket in the axial direction in the mounting state. The lock device is configured so that the first sprocket is slidable relative to the lock device in the axial direction in the assembled state and before the mounting state.

20 Claims, 27 Drawing Sheets

(56) References Cited

U.S. PATENT DOCUMENTS

| | | | | |
|---|---|---|---|---|
| 5,816,377 A * | 10/1998 | Nakamura | ............... | B62M 9/10 192/64 |
| 6,264,575 B1 * | 7/2001 | Lim | ................ | F16D 41/30 192/64 |
| 6,428,437 B1 * | 8/2002 | Schlanger | ............... | B62M 9/12 474/160 |
| 7,011,592 B2 | 3/2006 | Shahana et al. | | |
| 7,959,529 B2 * | 6/2011 | Braedt | ............... | B62M 9/10 474/158 |
| 8,197,371 B2 * | 6/2012 | D'Aluisio | ............... | B62M 9/12 301/110.5 |
| 8,956,254 B2 * | 2/2015 | Tokuyama | ............... | B62M 9/12 474/160 |
| 9,182,016 B2 * | 11/2015 | Spahr | ............... | F16H 9/06 |
| 9,533,735 B2 * | 1/2017 | Braedt | ............... | F16H 9/24 |
| 10,946,933 B2 * | 3/2021 | Braedt | ............... | B62M 9/10 |
| 11,059,541 B2 * | 7/2021 | Fujita | ............... | B60B 27/023 |
| 11,072,203 B2 * | 7/2021 | Bots | ............... | F16D 1/10 |
| 11,351,815 B2 * | 6/2022 | Thrash | ............... | B60B 27/047 |
| 2006/0014599 A1 * | 1/2006 | Meggiolan | ............... | B62M 9/10 474/160 |
| 2006/0258499 A1 * | 11/2006 | Kamada | ............... | B62M 9/10 474/160 |
| 2009/0042682 A1 * | 2/2009 | Dal Pra' | ............... | F16H 55/30 474/160 |
| 2010/0099530 A1 * | 4/2010 | Chiang | ............... | B62M 9/10 474/160 |
| 2011/0053721 A1 * | 3/2011 | Kamada | ............... | B62M 9/10 474/160 |
| 2012/0196711 A1 * | 8/2012 | Loy | ............... | B62M 9/10 474/160 |
| 2012/0225745 A1 * | 9/2012 | Oishi | ............... | B62M 9/121 474/160 |
| 2012/0244978 A1 * | 9/2012 | Liao | ............... | B62M 9/10 474/160 |
| 2012/0322598 A1 * | 12/2012 | Lin | ............... | B62M 9/10 474/160 |
| 2013/0017914 A1 | 1/2013 | Braedt | | |
| 2015/0024884 A1 | 1/2015 | Braedt et al. | | |
| 2015/0133249 A1 * | 5/2015 | Tsai | ............... | B62M 9/12 474/160 |
| 2016/0176477 A1 * | 6/2016 | Bernardele | ............... | B62M 9/12 474/160 |
| 2017/0057598 A1 * | 3/2017 | Thrash | ............... | B62M 9/10 |
| 2017/0369124 A1 * | 12/2017 | Kamada | ............... | F16H 55/30 |
| 2018/0009505 A1 * | 1/2018 | Kamada | ............... | F16H 55/30 |
| 2018/0105229 A1 * | 4/2018 | Reinbold | ............... | B62M 9/10 |
| 2019/0047324 A1 * | 2/2019 | Fujita | ............... | B62M 9/10 |
| 2019/0054765 A1 * | 2/2019 | Thrash | ............... | B60B 27/047 |
| 2021/0031876 A1 * | 2/2021 | Civiero | ............... | B62M 9/10 |
| 2021/0131547 A1 * | 5/2021 | Civiero | ............... | F16B 37/0892 |

* cited by examiner

REAR SPROCKET ASSEMBLY AND LOCK DEVICE

CROSS-REFERENCE TO RELATED APPLICATIONS

The present application is a continuation-in-part application of the U.S. patent application Ser. No. 17/244,862 filed Apr. 29, 2021. The contents of this application are incorporated herein by reference in their entirety.

BACKGROUND OF THE INVENTION

Field of the Invention

The present invention relates to a rear sprocket assembly and a lock device.

Discussion of the Background

A human-powered vehicle includes a sprocket assembly configured to be engage with a chain. The sprocket assembly includes a plurality of sprockets. The plurality of sprockets includes a smallest sprocket. The smallest sprocket preferably has a smaller tooth number in order to provide a wider gear range of the rear sprocket assembly. However, the smaller tooth number may make it harder to mount the smallest sprocket to a hub assembly.

SUMMARY OF THE INVENTION

In accordance with a first aspect of the present invention, a rear sprocket assembly is configured to be mounted to a rear hub assembly for a human-powered vehicle. The rear sprocket assembly comprises a first sprocket and a lock device. The first sprocket is a smallest sprocket in the rear sprocket assembly and includes a first sprocket body, a plurality of first sprocket teeth, and a first sprocket opening. The plurality of first sprocket teeth extends radially outwardly from the first sprocket body in a radial direction with respect to a rotational center axis of the rear sprocket assembly. The first sprocket opening is configured to receive a hub axle of the rear hub assembly in a mounting state where the rear sprocket assembly is mounted to the rear hub assembly. The first sprocket opening has a first radially minimum diameter that is smaller than an outermost diameter of a sprocket support body of the rear hub assembly. The lock device is configured to fix the rear sprocket assembly to the sprocket support body of the rear hub assembly in the mounting state. The lock device includes a first lock member and a second lock member. The first lock member includes a first axial end and a second axial end. The first axial end is configured to be detachably attached to the sprocket support body of the rear hub assembly in the mounting state. The second axial end is opposite to the first axial end in an axial direction with respect to the rotational center axis. The second lock member includes a third axial end and a fourth axial end. The third axial end is configured to be attached to the second axial end of the first lock member in an assembled state where the first sprocket and the lock device are assembled as one unit. The fourth axial end is opposite to the third axial end in the axial direction and has at least one radial projection configured to abut against the first sprocket in the axial direction in the mounting state. The lock device is configured so that the first sprocket is slidable relative to the lock device in the axial direction in the assembled state and before the mounting state.

With the rear sprocket assembly according to the first aspect, the lock device enables the smallest sprocket to be slidable relative to the lock device in the axial direction in the assembled state and before the mounting state. Thus, it is possible to smoothly mount the smallest sprocket to the sprocket support body of the rear hub assembly via the lock device if the smaller sprocket is too small to be directly mounted to the sprocket support body. Accordingly, it is possible to provide the rear sprocket assembly having a wider gear range while the first sprocket can be smoothly mounted to the rear hub assembly.

In accordance with a second aspect of the present invention, the rear sprocket assembly according to the first aspect is configured so that the first axial end has first threads configured to threadedly engage with threads provided to the sprocket support body of the rear hub assembly in the mounting state.

With the rear sprocket assembly according to the second aspect, the first threads of the first lock member enables the lock device to be easily attached to and detached from the sprocket support body of the rear hub assembly.

In accordance with a third aspect of the present invention, the rear sprocket assembly according to the second aspect is configured so that the second axial end has second threads. The third axial end has third threads configured to threadedly engage with the second threads of the first lock member in the assembled state.

With the rear sprocket assembly according to the third aspect, the second threads of the first lock member and the third threads of the second lock member enable the first lock member and the second lock member to be easily attached to and detached from each other.

In accordance with a fourth aspect of the present invention, the rear sprocket assembly according to the third aspect is configured so that the first lock member includes a first surface radially outwardly facing in the radial direction. The first surface is adjacent to the first threads. The second lock member includes a second surface radially outwardly facing in the radial direction. The second surface is adjacent to the third threads. The first surface is disposed radially outwardly from the second surface in the radial direction in the assembled state.

With the rear sprocket assembly according to the fourth aspect, the second surface can be disposed radially inwardly from the first surface with respect to the rotational center axis in the assembled state. Thus, it is possible to arrange the second surface more radially inwardly, enlarging a space provided radially between the second surface and at least one of the first sprocket and an adjacent sprocket. Accordingly, it is possible to improve discharge of foreign material such as mud from the space provided radially between the second surface and at least one of the first sprocket and the adjacent sprocket.

In accordance with a fifth aspect of the present invention, the rear sprocket assembly according to the fourth aspect is configured so that the second surface is disposed between the third threads and the at least one radial projection.

With the rear sprocket assembly according to the fifth aspect, it is possible to arrange the second surface more radially inwardly, enlarging a space provided radially between the second surface and the first sprocket. Accordingly, it is possible to improve discharge of foreign material such as mud from the space provided radially between the second surface and the first sprocket.

In accordance with a sixth aspect of the present invention, the rear sprocket assembly according to the fifth aspect is configured so that the first threads of the first lock member extend radially outwardly from the first surface in the radial direction. The first threads have a first radially maximum thread diameter. The at least one radial projection of the second lock member extending radially outwardly from the second surface in the radial direction. The at least one radial projection has a radially maximum projection diameter. The first radially minimum diameter of the first sprocket opening is smaller than each of the first radially maximum thread diameter of the first threads and the radially maximum projection diameter of the at least one radial projection.

With the rear sprocket assembly according to the sixth aspect, it is possible to assemble the first sprocket and the lock device as one unit, enabling the first sprocket to be easily attached to and detached from the sprocket support body of the rear sprocket assembly.

In accordance with a seventh aspect of the present invention, the rear sprocket assembly according to any one of the fourth to sixth aspects is configured so that the first sprocket has a first radially minimum portion defining the first radially minimum diameter of the first sprocket opening. The first radially minimum portion of the first sprocket is disposed radially outwardly of the second surface in the assembled state.

With the rear sprocket assembly according to the seventh aspect, it is possible to enlarge the space provided radially between the second surface and the first sprocket. Accordingly, it is possible to improve discharge of foreign material such as mud from the space provided radially between the second surface and the first sprocket.

In accordance with an eighth aspect of the present invention, the rear sprocket assembly according to any one of the second to seventh aspects is configured so that the first sprocket is slidable between the first threads of the first lock member and the at least one radial projection of the second lock member in the axial direction in the assembled state.

With the rear sprocket assembly according to the eighth aspect, it is possible to adjust a rotational position of the first sprocket relative to the sprocket support body of the rear hub assembly in a circumferential direction with respect to a rotational center axis of the rear sprocket assembly.

In accordance with a ninth aspect of the present invention, the rear sprocket assembly according to any one of the first to eighth aspects is configured so that the first axial end of the first lock member includes a first tool engagement profile. The fourth axial end of the second lock member includes a second tool engagement profile.

With the rear sprocket assembly according to the ninth aspect, it is possible to easily assemble the first lock member and the second lock member using the first tool engagement profile and the second tool engagement profile.

In accordance with a tenth aspect of the present invention, the rear sprocket assembly according to any one of the second to ninth aspects is configured so that the lock device is configured to dispose the first sprocket between the first threads of the first lock member and the at least one radial projection of the second lock member in the axial direction in the assembled state.

With the rear sprocket assembly according to the tenth aspect, it is possible to adjust a rotational position of the first sprocket relative to the sprocket support body of the rear hub assembly in a circumferential direction with respect to a rotational center axis of the rear sprocket assembly.

In accordance with an eleventh aspect of the present invention, the rear sprocket assembly according to any one of the first to tenth aspects is configured so that the first lock member has an axial contact surface. The axial contact surface is configured to contact the third axial end of the second lock member in the assembled state.

With the rear sprocket assembly according to the eleventh aspect, it is possible to provide preferable coupling strength between the lock device and the sprocket support body when the first lock member and the second lock member are assembled to the sprocket support body.

In accordance with a twelfth aspect of the present invention, the rear sprocket assembly according to any one of the first to eleventh aspects is configured so that the first sprocket has a first axially outward surface and a first axially inward surface. The first axially outward surface and the first axially inward surface face toward opposite directions to each other in the axial direction. The first axially inward surface is configured to face toward an axial center plane of the human-powered vehicle in the mounting state. The first sprocket includes a first axially inwardly torque transmitting profile provided to the first axially inward surface. The first axially inwardly torque transmitting profile is configured to, in a torque-transmitting manner, engage with a second axially outwardly torque transmitting profile of a second sprocket adjacent to the first sprocket without another sprocket between the first sprocket and the second sprocket in the axial direction in the mounting state.

With the rear sprocket assembly according to the twelfth aspect, it is possible to reliably transmit rotational force between the first sprocket and the second sprocket.

In accordance with a thirteenth aspect of the present invention, the rear sprocket assembly according to any one of the first to twelfth aspects is configured so that the third axial end of the second lock member is configured to be detachably attached to the second axial end of the first lock member in the assembled state.

With the rear sprocket assembly according to the thirteenth aspect, it is possible to assemble the first sprocket and the lock device as one unit even if at least one of the first lock member and the second lock member includes a large diameter part having a large outer diameter which is larger than an inner diameter of the first sprocket, and/or to replace the first sprocket with a new sprocket when the first lock member is detached from the second lock member.

In accordance with a fourteenth aspect of the present invention, a rear sprocket assembly is configured to be mounted to a rear hub assembly for a human-powered vehicle. The rear sprocket assembly comprises a first sprocket and a lock device. The first sprocket is a smallest sprocket in the rear sprocket assembly and includes a first sprocket body, a plurality of first sprocket teeth, and a first sprocket opening. The plurality of first sprocket teeth extends radially outwardly from the first sprocket body in a radial direction with respect to a rotational center axis of the rear sprocket assembly. The first sprocket opening is configured to receive a hub axle of the rear hub assembly in a mounting state where the rear sprocket assembly is mounted to the rear hub assembly. The first sprocket opening has a first radially minimum diameter that is smaller than an outermost diameter of a sprocket support body of the rear hub assembly. The lock device is configured to fix the rear sprocket assembly to the sprocket support body of the rear hub assembly in the mounting state. The lock device includes an axially inward end and an axially outward end. The axially inward end has first threads configured to threadedly engage with threads provided to the sprocket support body of the rear hub assembly in the mounting state. The first threads have a first radially maximum thread diameter. The axially outward end is opposite to the axially inward end in the axial direction and has at least one radial projection configured to abut against the first sprocket in the axial direction in the mounting state. The at least one radial projection has a radially maximum projection diameter. The first radially minimum diameter of the first sprocket opening is smaller than each of the first radially maximum thread diameter of the first threads and the radially maximum projection diameter of the at least one radial projection. The lock device is configured so that the first sprocket is slidable relative to the lock device in the axial direction in the assembled state and before the mounting state.

With the rear sprocket assembly according to the fourteenth aspect, the lock device enables the smallest sprocket to be slidable relative to the lock device in the axial direction in the assembled state and before the mounting state. Thus, it is possible to smoothly mount the smallest sprocket to the sprocket support body of the rear hub assembly via the lock device if the smaller sprocket is too small to be directly mounted to the sprocket support body. Accordingly, it is possible to provide the rear sprocket assembly having a wider gear range while the first sprocket can be smoothly mounted to the rear hub assembly.

In accordance with a fifteenth aspect of the present invention, the rear sprocket assembly according to the fourteenth aspect is configured so that the lock device is a one-piece, unitary member.

With the rear sprocket assembly according to the fifteenth aspect, it is possible to improve strength of the lock device.

In accordance with a sixteenth aspect of the present invention, the rear sprocket assembly according to the fifteenth aspect is configured so that the at least one radial projection of the lock device is formed by material deformation.

With the rear sprocket assembly according to the sixteenth aspect, it is possible to assemble the first sprocket and the lock device as one unit even if at least one of the lock device includes a large diameter part having a large outer diameter which is larger than an inner diameter of the first sprocket.

In accordance with a seventeenth aspect of the present invention, a lock device for mounting a plurality of rear sprockets to a rear hub assembly for a human-powered vehicle comprises a first lock member and a second lock member. The first lock member includes a first axial end, a second axial end, and a first surface. The first axial end is configured to be detachably attached to the sprocket support body of the rear hub assembly in a mounting state where the plurality of rear sprockets is mounted to the rear hub assembly. The second axial end is opposite to the first axial end in an axial direction with respect to a rotational center axis of the plurality of rear sprockets. The first surface radially outwardly faces in a radial direction with respect to the rotational center axis. The second lock member includes a third axial end, a fourth axial end, and a second surface. The third axial end is configured to be attached to the second axial end of the first lock member in an assembled state where a smallest sprocket and the lock device are assembled as one unit. The fourth axial end is opposite to the third axial end in the axial direction and has at least one radial projection. The second surface radially outwardly faces in the radial direction. The second surface is adjacent to the at least one radial projection in the axial direction. The at least one radial projection of the second lock member extends radially outwardly from the second surface in the radial direction and is configured to abut against the smallest sprocket of the plurality of rear sprockets in the axial direction in the mounting state. The first surface is disposed radially outwardly from the second surface in the radial direction in the assembled state. The plurality of rear sprockets includes an adjacent sprocket adjacent to the smallest sprocket without another sprocket between the adjacent sprocket and the smallest sprocket in the axial direction. The lock device is configured so that the adjacent sprocket is slidable in the axial direction relative to the lock device in a space provided radially outwardly of the first surface and the second surface in the assembled state and before the mounting state.

With the lock device according to the seventeenth aspect, the adjacent sprocket is slidable in the axial direction relative to the lock device in a space provided radially outwardly of the first surface and the second surface in the assembled state and before the mounting state. Thus, it is possible to smoothly mount at least one of the smallest sprocket and the adjacent sprocket to the sprocket support body of the rear hub assembly via the lock device if at least one of the smaller sprocket and the adjacent sprocket is too small to be directly mounted to the sprocket support body. Accordingly, it is possible to provide the rear sprocket assembly having a wider gear range while at least one of the smallest sprocket and the adjacent sprocket can be smoothly mounted to the rear hub assembly.

In accordance with an eighteenth aspect of the present invention, the rear sprocket assembly according to the seventeenth aspect is configured so that the lock device is configured so that the smallest sprocket is static relative to the lock device in the axial direction in the assembled state.

With the lock device according to the eighteenth aspect, it is possible to reduce size of the lock device in the axial direction while at least one of the smallest sprocket and the adjacent sprocket can be smoothly mounted to the rear hub assembly.

In accordance with a nineteenth aspect of the present invention, the rear sprocket assembly according to the seventeenth or eighteenth aspect is configured so that the first axial end has first threads configured to threadedly engage with threads provided to a sprocket support body of the rear hub assembly in the mounting state.

With the rear sprocket assembly according to the nineteenth aspect, the first threads of the first lock member enables the lock device to be easily attached to and detached from the sprocket support body of the rear hub assembly.

In accordance with a twentieth aspect of the present invention, the rear sprocket assembly according to any one of the seventeenth to nineteenth aspect is configured so that the third axial end of the second lock member is configured to be detachably attached to the second axial end of the first lock member in the assembled state.

With the rear sprocket assembly according to the twentieth aspect, it is possible to assemble the smallest sprocket and the lock device as one unit even if at least one of the first lock member and the second lock member includes a large diameter part having a large outer diameter which is larger than an inner diameter of the smallest sprocket, and/or to replace the smallest sprocket with a new sprocket when the first lock member is detached from the second lock member.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
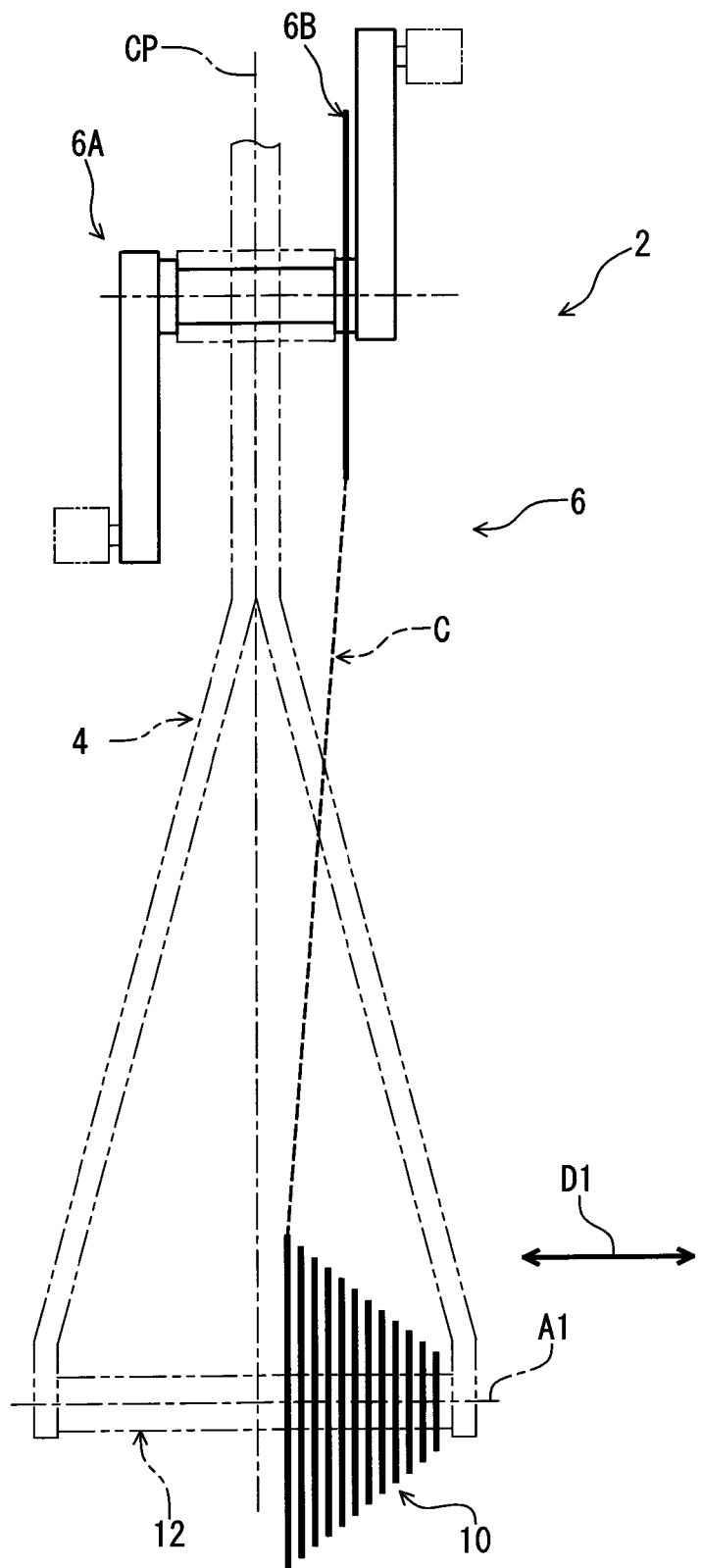
FIG. 1 is a schematic diagram of a human-powered vehicle including a rear sprocket assembly in accordance with an embodiment.

The embodiment(s) will now be described with reference to the accompanying drawings, wherein like reference numerals designate corresponding or identical elements throughout the various drawings.

As seen in FIG. 1, a human-powered vehicle 2 includes a vehicle body 4 and a drive train 6. The drive train 6 includes a rear sprocket assembly 10 and a rear hub assembly 12. The rear hub assembly 12 is secured to the vehicle body 4. The rear sprocket assembly 10 is configured to be mounted to the rear hub assembly 12 for the human-powered vehicle 2. The rear sprocket assembly 10 is rotatably supported by the rear hub assembly 12 relative to the vehicle body 4 about a rotational center axis A1. The human-powered vehicle 2 has an axial center plane CP. The axial center plane CP is defied in a transverse center position of the vehicle body 4 of the human-powered vehicle 2. The axial center plane CP is perpendicular to the rotational center axis A1.

The drive train 6 includes a crank assembly 6A, a front sprocket 6B, and a chain C. The crank assembly 6A is rotatably mounted to the vehicle body 4. The front sprocket 6B is secured to crank assembly 6A. The chain C is engaged with the front sprocket 6B and the rear sprocket assembly 10 to transmit pedaling force from the front sprocket 6B to the rear sprocket assembly 10. The front sprocket 6B includes a single sprocket wheel in the present embodiment. However, the front sprocket 6B can include a plurality of sprocket wheels.

In the present application, the following directional terms "front," "rear," "forward," "rearward," "left," "right," "transverse," "upward" and "downward" as well as any other similar directional terms refer to those directions which are determined on the basis of a user (e.g., a rider) who is in the user's standard position (e.g., on a saddle or a seat) in the human-powered vehicle 2 with facing a handlebar or steering. Accordingly, these terms, as utilized to describe the rear sprocket assembly 10, the rear hub assembly 12, or other components, should be interpreted relative to the human-powered vehicle 2 equipped with the rear sprocket assembly 10, the rear hub assembly 12, or other components as used in an upright riding position on a horizontal surface.

In the present application, a human-powered vehicle includes a various kind of bicycles such as a mountain bike, a road bike, a city bike, a cargo bike, a hand bike, and a recumbent bike. Furthermore, the human-powered vehicle includes an electric bike (E-bike). The electric bike includes an electrically assisted bicycle configured to assist propulsion of a vehicle with an electric motor. However, a total number of wheels of the human-powered vehicle is not limited to two. For example, the human-powered vehicle includes a vehicle having one wheel or three or more wheels. Especially, the human-powered vehicle does not include a vehicle that uses only an internal-combustion engine as motive power. Generally, a light road vehicle, which includes a vehicle that does not require a driver's license for a public road, is assumed as the human-powered vehicle.

Figure 2:
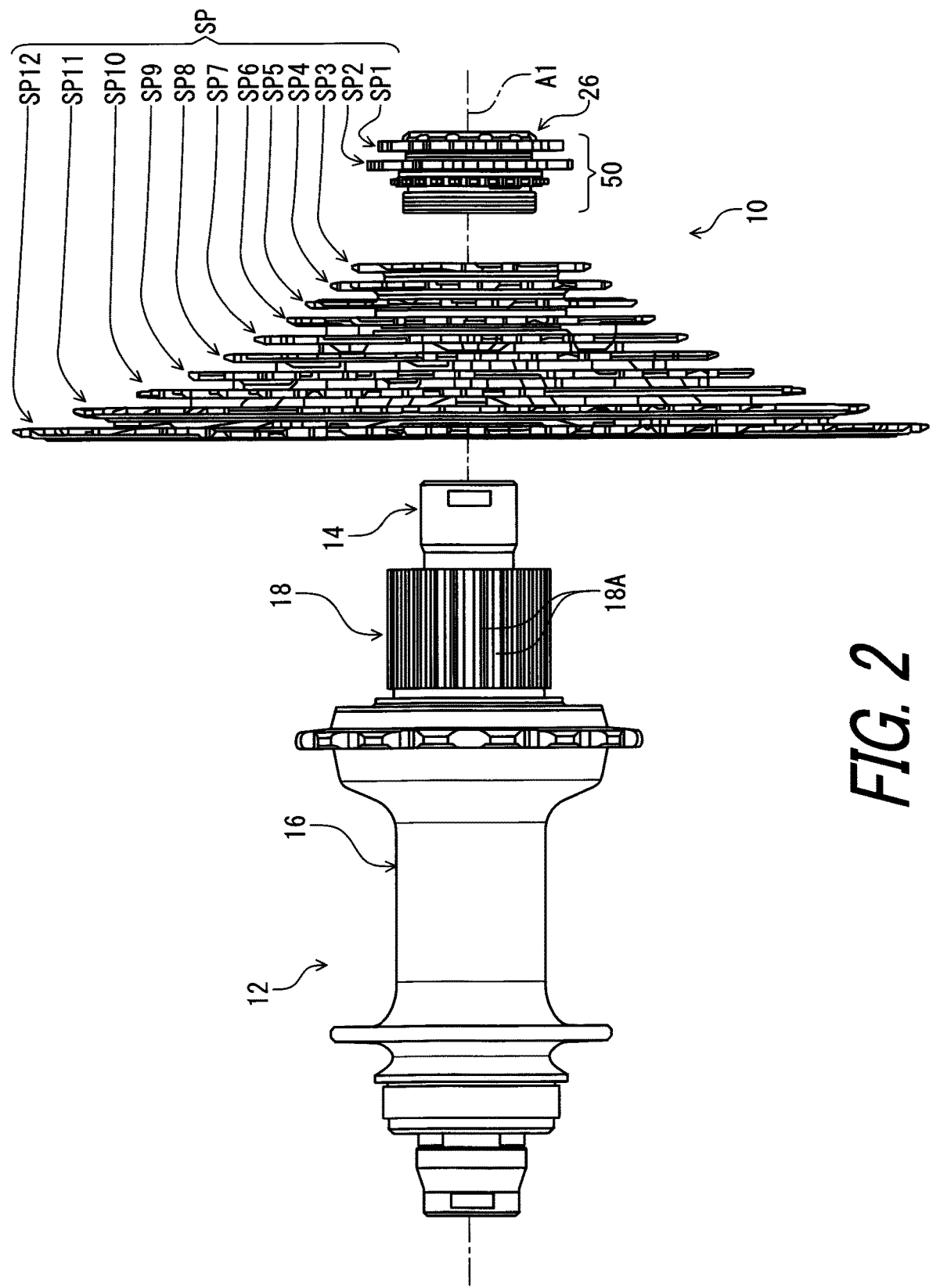
FIG. 2 is an exploded rear view of the rear sprocket assembly and a rear hub assembly of the human-powered vehicle illustrated in FIG. 1.

As seen in FIG. 2, the rear sprocket assembly 10 includes a plurality of rear sprockets SP. The plurality of rear sprockets SP is configured to engage with a chain C. The plurality of rear sprockets SP includes first to twelfth sprockets SP1 to SP12. Namely, the rear sprocket assembly 10 comprises the first sprocket SP1 and the second sprocket SP2. However, the total number of the plurality of sprockets SP is not limited to twelve.

The rear hub assembly 12 includes a hub axle 14, a hub body 16, and a sprocket support body 18. The hub axle 14 is configured to be secured to the vehicle body 4 (see e.g., FIG. 1) of the human-powered vehicle 2. The hub body 16 is rotatably mounted on the hub axle 14 about the rotational center axis A1. The sprocket support body 18 is rotatably mounted on the hub axle 14 about the rotational center axis A1.

The rear sprocket assembly 10 is configured to be mounted to the sprocket support body 18. The sprocket support body 18 includes a plurality of external spline teeth 18A. The rear sprocket assembly 10 is configured to engage with the plurality of external spline teeth 18A of the sprocket support body 18.

Figure 3:
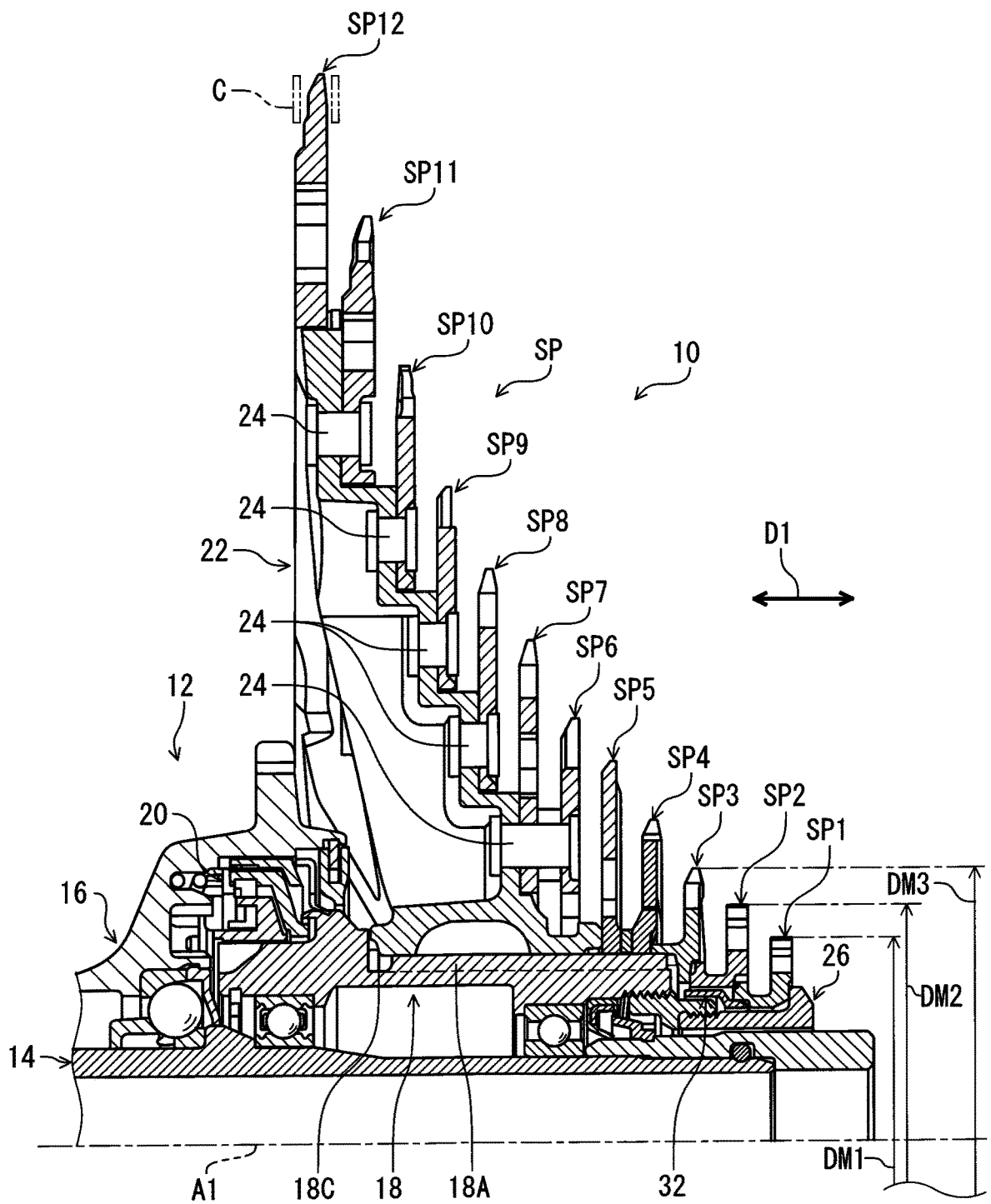
FIG. 3 is a cross-sectional view of the rear sprocket assembly and the rear hub assembly illustrated in FIG. 2.

As seen in FIG. 3, the rear hub assembly 12 includes a ratchet structure 20 The ratchet structure 20 is configured to allow the sprocket support body 18 to rotate relative to the hub body 16 about the rotational center axis A1 in only one rotational direction. The ratchet structure 20 is configured to restrict the sprocket support body 18 from rotating relative to the hub body 16 about the rotational center axis A1 in the other rotational direction.

The first sprocket SP1 has a first sprocket outer diameter DM1. The second sprocket SP2 has a second sprocket outer diameter DM2 larger than the first sprocket outer diameter DM1. The second sprocket SP2 is adjacent to the first sprocket SP1 without another sprocket between the first sprocket SP1 and the second sprocket SP2 in an axial direction D1 with respect to the rotational center axis A1. The second sprocket SP2 can also be referred to as an adjacent sprocket SP2. Thus, the plurality of rear sprockets SP includes the adjacent sprocket SP2. The first sprocket outer diameter DM1 is the smallest among outer diameters of the first to twelfth sprockets SP1 to SP12 in the present embodiment. Thus, the first sprocket SP1 can also be referred to as a smallest sprocket SP1. Thus, the first sprocket SP1 is a smallest sprocket SP1 in the rear sprocket assembly 10. The first sprocket SP1 can also be referred to as a top-gear sprocket SP1. The adjacent sprocket SP2 is adjacent to the smallest sprocket SP1 without another sprocket between the adjacent sprocket SP2 and the smallest sprocket SP1 in the axial direction D1.

The third sprocket SP3 has a third sprocket outer diameter DM3 which is larger than the second sprocket outer diameter DM2. The third sprocket SP3 is adjacent to the second sprocket SP2 without another sprocket between the second sprocket SP2 and the third sprocket SP3 in the axial direction D1.

The rear sprocket assembly 10 includes a sprocket carrier 22. The sixth to twelfth sprockets SP6 to SP12 are mounted on the sprocket carrier 22. The sixth to twelfth sprockets SP6 to SP12 are secured to the sprocket carrier 22 with fasteners 24 such as rivets in the present embodiment. However, a total number of sprockets secured to the sprocket carrier 22 is not limited to the embodiment illustrated in FIG. 3. The sprocket carrier 22 is configured to be in contact with a positioning surface 18C of the sprocket support body 18. However, the structure of the sprocket carrier 22 is not limited to the structure illustrated in FIG. 3. The sprocket carrier 22 can be omitted from the rear sprocket assembly 10 if needed and/or desired. In such a case, all of the sprockets directly engage with the sprocket support body 18.

Figure 4:
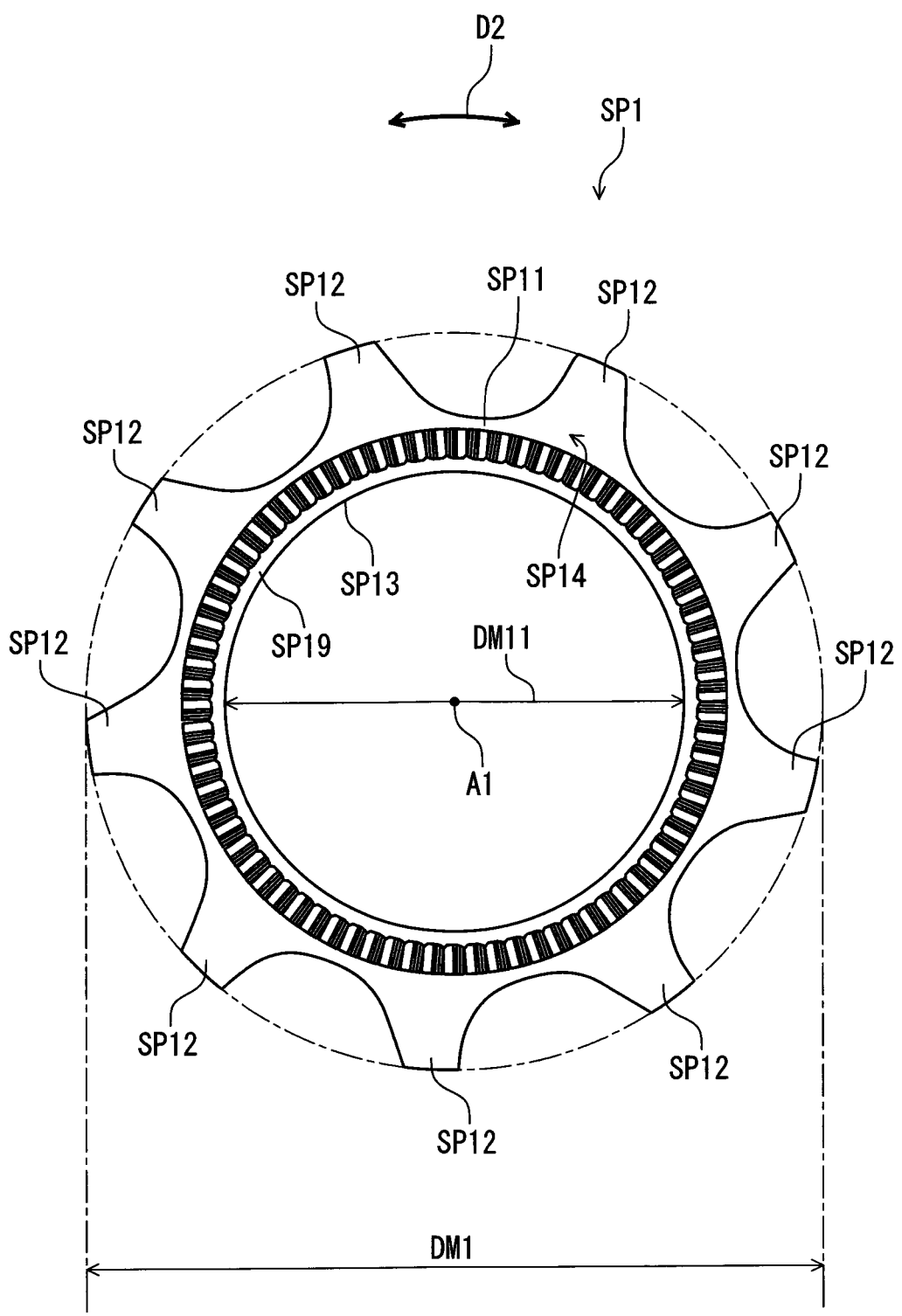
FIG. 4 is a side elevational view of a sprocket of the rear sprocket assembly illustrated in FIG. 2.

As seen in FIG. 4, the first sprocket SP1 includes a first sprocket body SP11, a plurality of first sprocket teeth SP12, and a first sprocket opening SP13. The plurality of first sprocket teeth SP12 extends radially outwardly from the first sprocket body SP11 in a radial direction with respect to the rotational center axis A1 of the rear sprocket assembly 10. The plurality of first sprocket teeth SP12 define the first sprocket outer diameter DM1. The first sprocket opening SP13 of the first sprocket SP1 has a first diameter DM11. The first sprocket SP1 has a first radially minimum portion SP19 defining the first radially minimum diameter DM11 of the first sprocket opening SP13. In the present embodiment, a total number of the first sprocket teeth SP12 is nine. However, the total number of the first sprocket teeth SP12 is not limited to nine.

Figure 5:
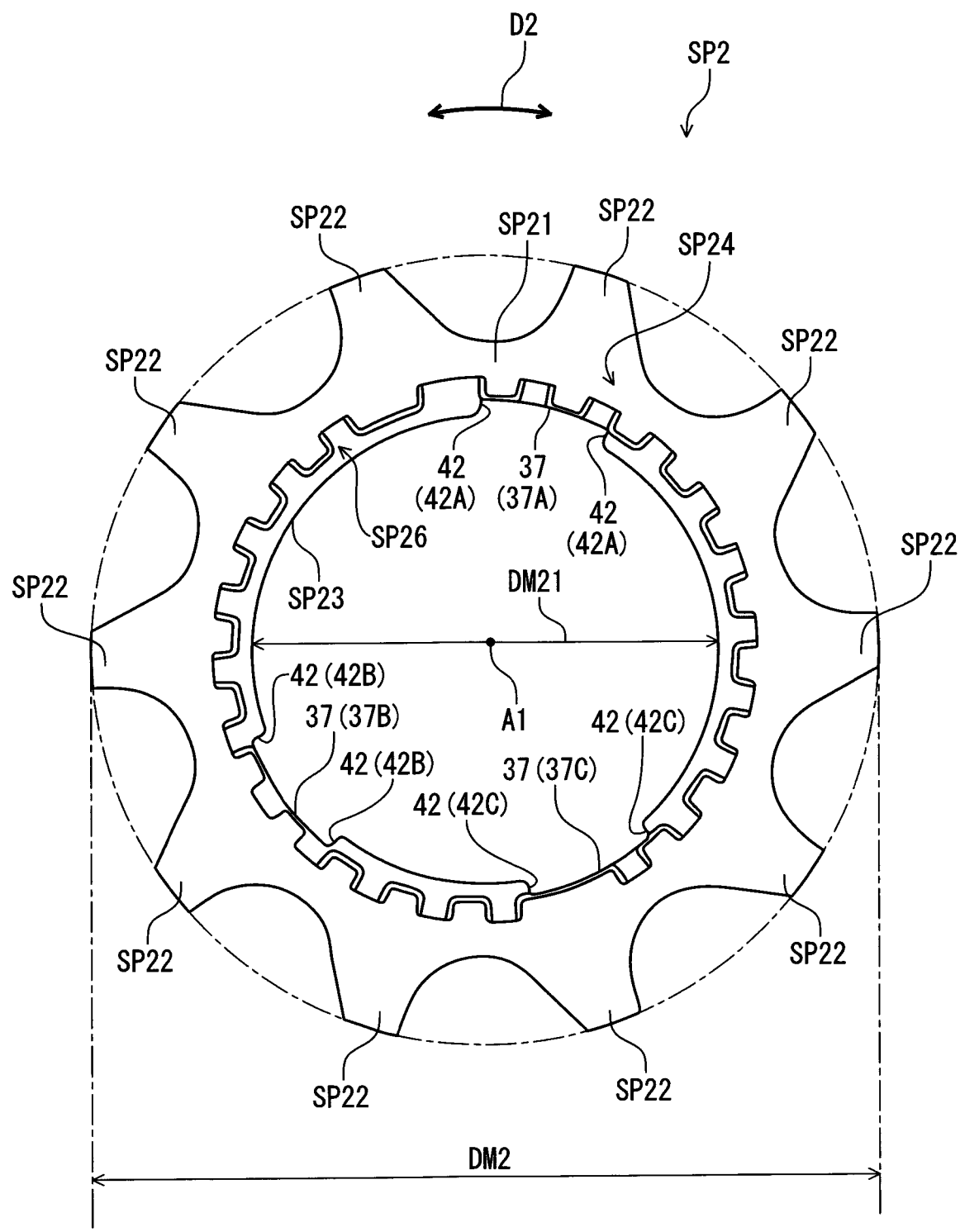
FIG. 5 is another side elevational view of a sprocket of the rear sprocket assembly illustrated in FIG. 2.

As seen in FIG. 5, the second sprocket SP2 includes a second sprocket body SP21, a plurality of second sprocket teeth SP22, and a second sprocket opening SP23. The plurality of second sprocket teeth SP22 extends radially outwardly from the second sprocket body SP21 in the radial direction. The plurality of second sprocket teeth SP22 defines the second sprocket outer diameter DM2. The second sprocket opening SP23 of the second sprocket SP2 has a second diameter DM21. In the present embodiment, a total number of the second sprocket teeth SP22 is ten. However, the total number of the second sprocket teeth SP22 is not limited to ten.

Figure 6:
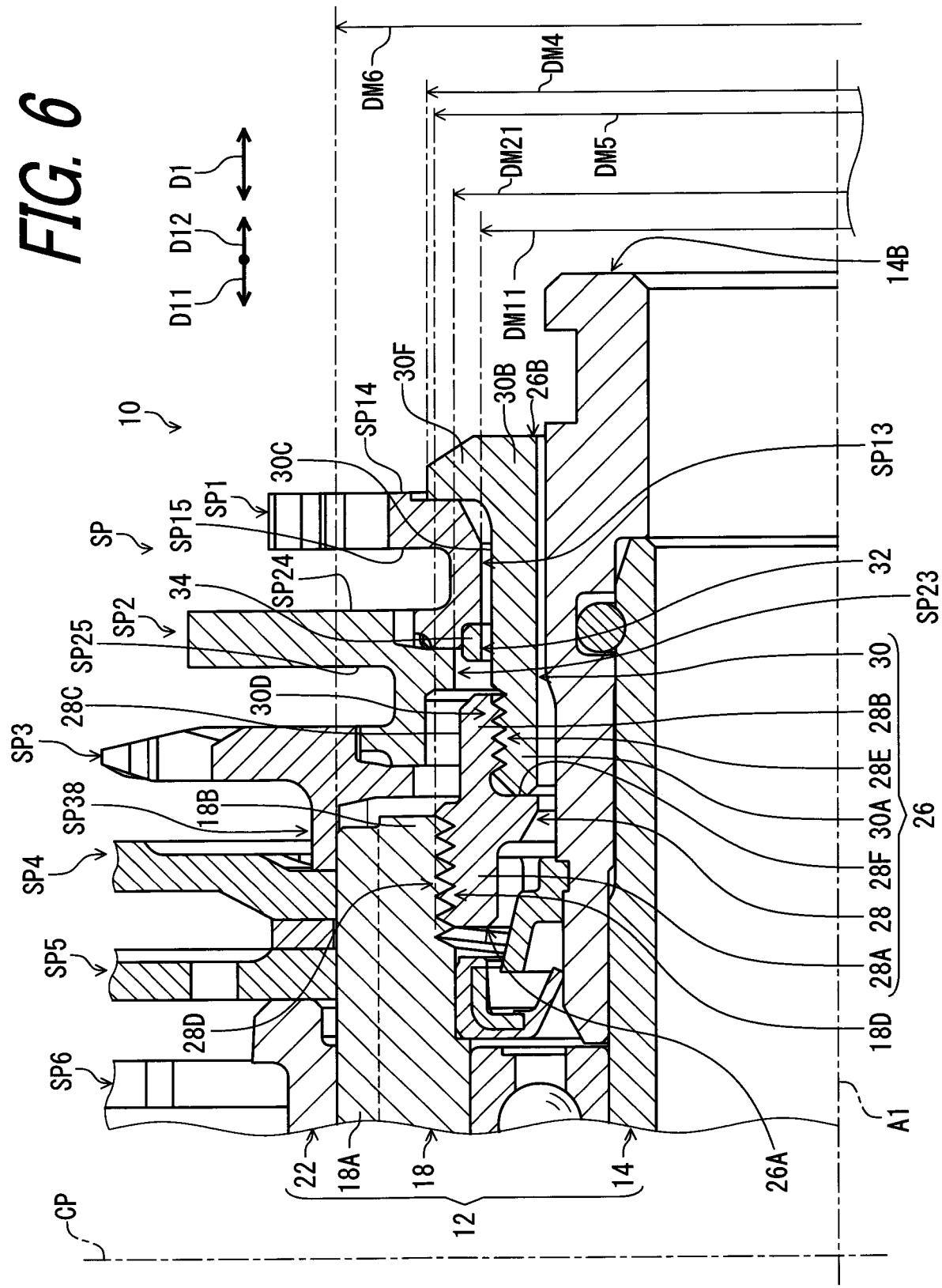
FIG. 6 is a partial cross-sectional view of the rear sprocket assembly and the rear hub assembly illustrated in FIG. 2.

As seen in FIG. 6, the first sprocket opening SP13 is configured to receive the hub axle 14 of the rear hub assembly 12 in a mounting state where the rear sprocket assembly 10 is mounted to the rear hub assembly 12. The first diameter DM11 is smaller than an outermost diameter DM6 of the sprocket support body 18 of the rear hub assembly 12. The first diameter DM11 can also be referred to as a first radially minimum diameter DM11. Thus, the first sprocket opening SP13 has the first radially minimum diameter DM11 that is smaller than the outermost diameter DM6 of the sprocket support body 18 of the rear hub assembly 12. The plurality of spline teeth 18A define the outermost diameter DM6. However, the first diameter DM11 can be larger than or equal to the outermost diameter DM6 of the sprocket support body 18 if needed and/or desired.

The second sprocket opening SP23 is configured to receive the hub axle 14 of the rear hub assembly 12 in the mounting state. The second diameter DM21 is smaller than the outermost diameter DM6 of the sprocket support body 18 of the rear hub assembly 12. The second diameter DM21 is larger than the first diameter DM11. However, the second diameter DM21 can be smaller than or equal to the first diameter DM11 if needed and/or desired. The second diameter DM21 can be larger than or equal to the outermost diameter DM6 of the sprocket support body 18 if needed and/or desired.

The sprocket support body 18 includes an axial end 18B provided on an axial outermost end of the sprocket support body 18 in the axial direction D1. The hub axle 14 includes an axial end 14B provided on an axial outermost end of the hub axle 14 in the axial direction D1. The first sprocket SP1 is configured to be provided between the axial ends 14B and 18B in the axial direction D1. The second sprocket SP2 is configured to be provided between the axial ends 14B and 18B in the axial direction D1.

The rear sprocket assembly 10 comprises a lock device 26. The lock device 26 is configured to fix the rear sprocket assembly 10 to the sprocket support body 18 of the rear hub assembly 12 in the mounting state. The lock device 26 is configured to mount the first sprocket SP1 and the second sprocket SP2 to the rear hub assembly 12. As seen in FIG. 3, the lock device 26 is configured to be attached to the sprocket support body 18 to hold the sprocket carrier 22 and the first to fifth sprockets SP1 to SP5 between the lock device 26 and the positioning surface 18C of the sprocket support body 18 in the axial direction D1.

As seen in FIG. 6, the lock device 26 includes an axially inward end 26A and an axially outward end 26B. The axially outward end 26B is opposite to the axially inward end 26A in the axial direction D1. The lock device 26 for mounting the plurality of rear sprockets SP to the rear hub assembly 12 for the human-powered vehicle 2 comprises a first lock member 28 and a second lock member 30. The first lock member 28 includes the axially inward end 26A. The second lock member 30 includes the axially outward end 26B.

The first lock member 28 is configured to detachably engage with the sprocket support body 18 of the rear hub assembly 12 in the mounting state. The second lock member 30 is configured to detachably engage with the first lock member 28 so as to abut against the first sprocket SP1 in the axial direction D1 in the mounting state. In the present embodiment, the first lock member 28 is a separate member from the second lock member 30. However, the first lock member 28 can be integrally provided with the second lock member 30 as a one-piece unitary member if needed and/or desired.

The first lock member 28 is configured to detachably engage with the axial end 18B of the sprocket support body 18 in the mounting state. The first lock member 28 is configured to be at least partly provided in the second sprocket opening SP23 in the mounting state. The second lock member 30 is configured to be at least partly provided in the first sprocket opening SP13 and the second sprocket opening SP23 in the mounting state.

The term "detachable" or "detachably" as used herein, encompasses a configuration in which an element is repeatedly detachable from and attachable to another element without substantial damage.

Figure 7:
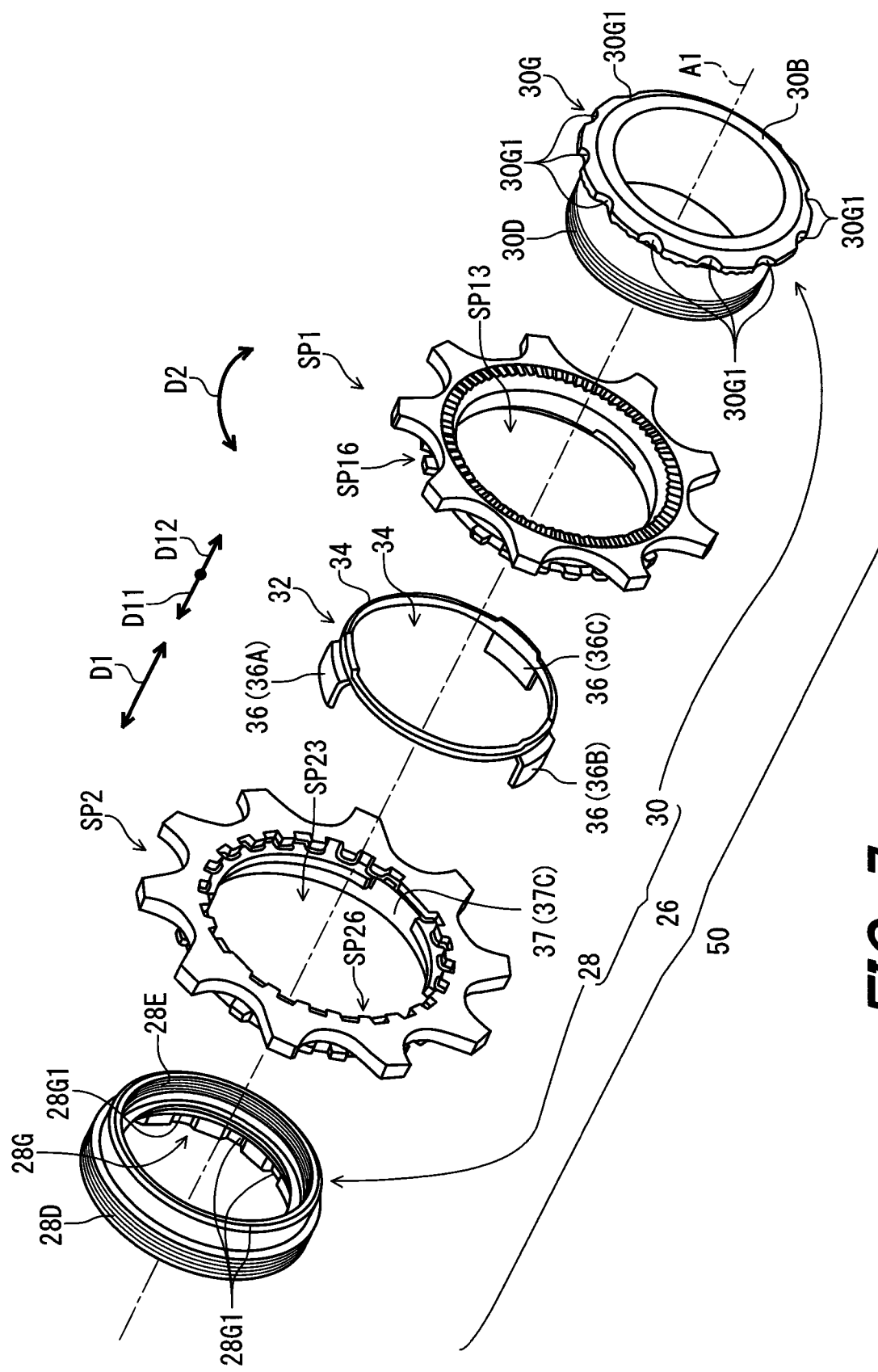
FIG. 7 is an exploded perspective view of a lock device assembly of the rear sprocket assembly illustrated in FIG. 2.
Figure 8:
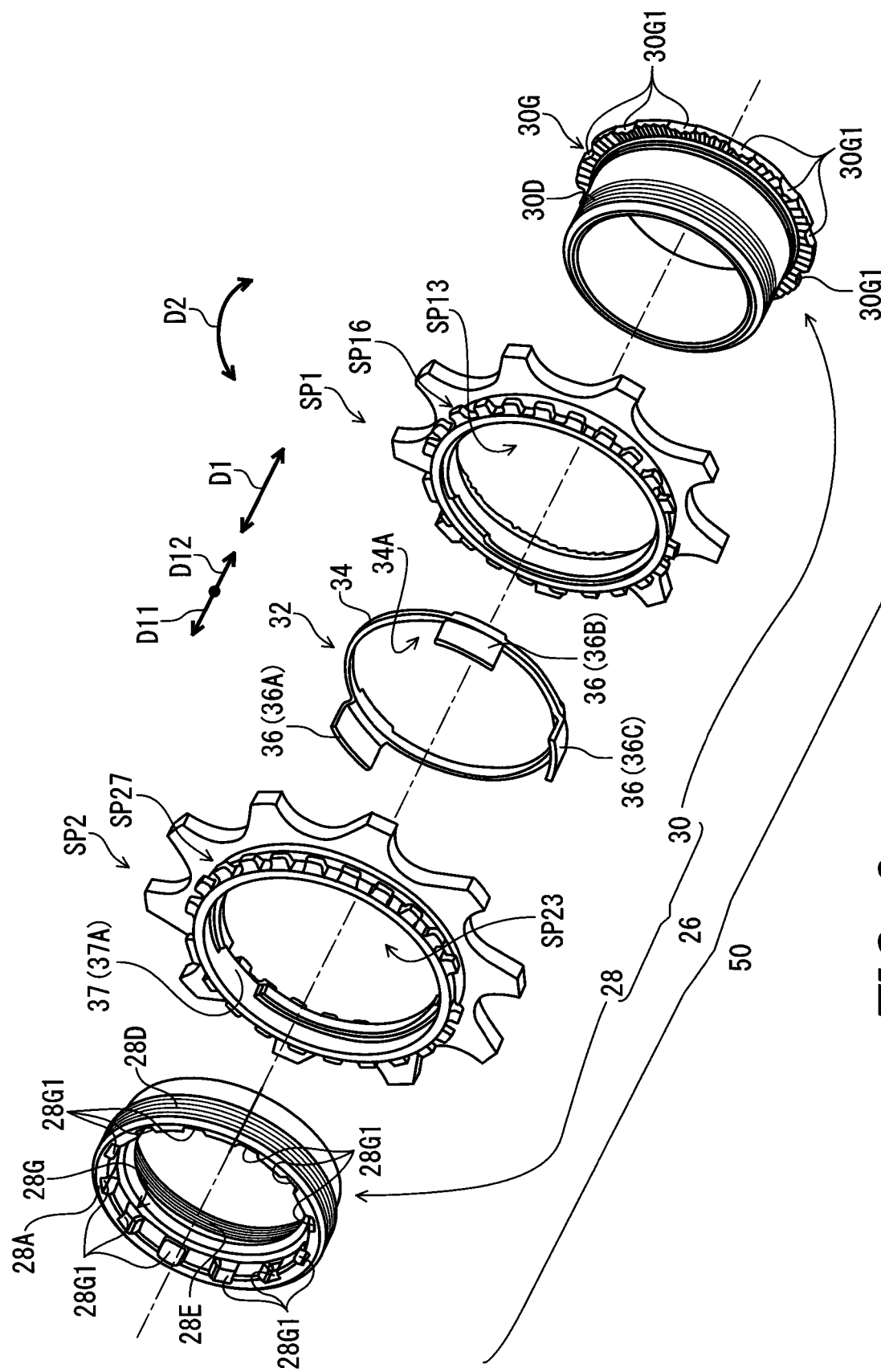
FIG. 8 is another exploded perspective view of the lock device assembly of the rear sprocket assembly illustrated in FIG. 2.

As seen in FIGS. 7 and 8, the rear sprocket assembly 10 comprises at least one tooth-position maintaining member 32. The at least one tooth-position maintaining member 32 is configured to maintain a relative position between the plurality of first sprocket teeth SP12 and the plurality of second sprocket teeth SP22 in a circumferential direction D2 with respect to the rotational center axis A1. In the present embodiment, the rear sprocket assembly 10 comprises the tooth-position maintaining member 32. However, the rear sprocket assembly 10 can comprise a plurality of tooth-position maintaining member 32 if needed and/or desired. The at least one tooth-position maintaining member 32 can be omitted from the rear sprocket assembly 10 if needed and/or desired.

The at least one tooth-position maintaining member 32 includes a fixed portion 34 and at least one guide portion 36. The fixed portion 34 is configured to be fixed to one of the first sprocket SP1 and the second sprocket SP2. The at least one guide portion 36 is configured to engage with the other of the first sprocket SP1 and the second sprocket SP2 such that the other of the first sprocket SP1 and the second sprocket SP2 is slidable relative to the one of the first sprocket SP1 and the second sprocket SP2 in the axial direction D1.

In the present embodiment, the tooth-position maintaining member 32 includes the fixed portion 34 and the at least one guide portion 36. The fixed portion 34 is fixed to the first sprocket SP1. The fixed portion 34 is fixed to the first sprocket SP1 in a press-fit manner. The fixed portion 34 has an annular shape. The fixed portion 34 includes an opening 34A. However, the shape of the fixed portion is not limited to the annular shape.

The at least one guide portion 36 is configured to engage with the second sprocket SP2 such that the second sprocket SP2 is slidable relative to the first sprocket SP1 in the axial direction D1. However, the fixed portion 34 can be configured to be fixed to the first sprocket SP1 if needed and/or desired. The fixed portion 34 can be fixed to the second sprocket SP2 if needed and/or desired. The fixed portion 34 can be fixed to the one of the first sprocket SP1 and the second sprocket SP2 in a manner other than the press-fit manner. The at least one guide portion 36 can be configured to engage with the first sprocket SP1 such that the first sprocket SP1 is slidable relative to the second sprocket SP2 in the axial direction D1 if needed and/or desired.

The at least one guide portion 36 includes a plurality of guide portions 36. The at least one guide portion 36 includes a first guide portion 36A, a second guide portion 36B, and a third guide portion 36C. The at least one guide portion 36 extends from the fixed portion 34 in the axial direction D1. The first guide portion 36A, the second guide portion 36B, and the third guide portion 36C extend from the fixed portion 34 in the axial direction D1. The first guide portion 36A, the second guide portion 36B, and the third guide portion 36C are spaced apart from each other in the circumferential direction D2.

In the present embodiment, the at least one guide portion 36 includes the first guide portion 36A, the second guide portion 36B, the third guide portion 36C, and no other guide portion which is configured to engage with the second sprocket SP2 such that the second sprocket SP2 is slidable relative to the first sprocket SP1 in the axial direction D1. However, a total number of the at least one guide portion 36 is not limited to three.

The first guide portion 36A, the second guide portion 36B, and the third guide portion 36C are configured to engage with the second sprocket SP2 such that the second sprocket SP2 is slidable relative to the first sprocket SP1 in the axial direction D1. However, the at least one guide portion 36 can be configured to engage with the first sprocket SP1 such that the first sprocket SP1 is slidable relative to the second sprocket SP2 in the axial direction D1 if needed and/or desired.

Figure 9:
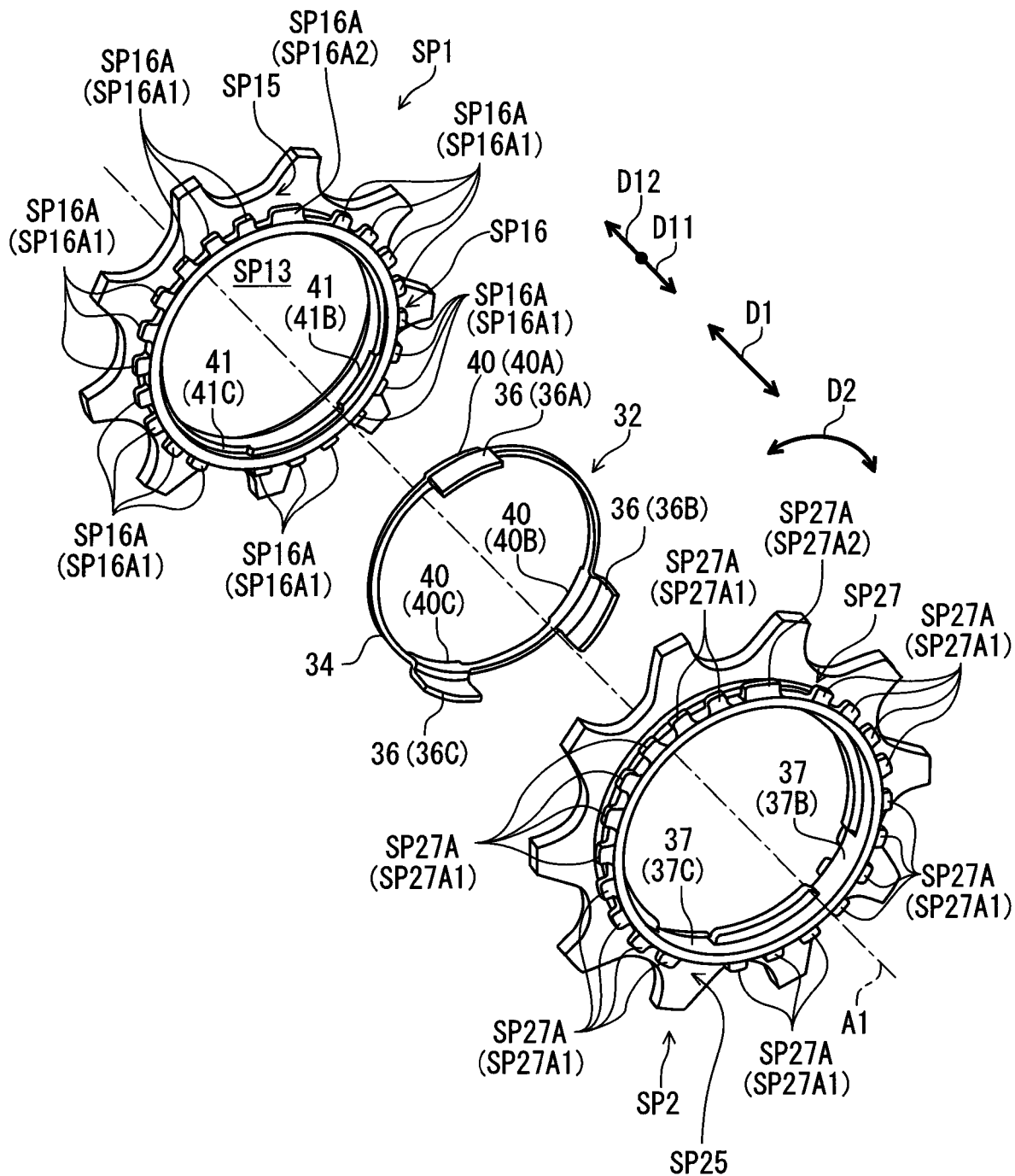
FIG. 9 is an exploded perspective view of a part of the lock device assembly of the rear sprocket assembly illustrated in FIG. 2.
Figure 10:
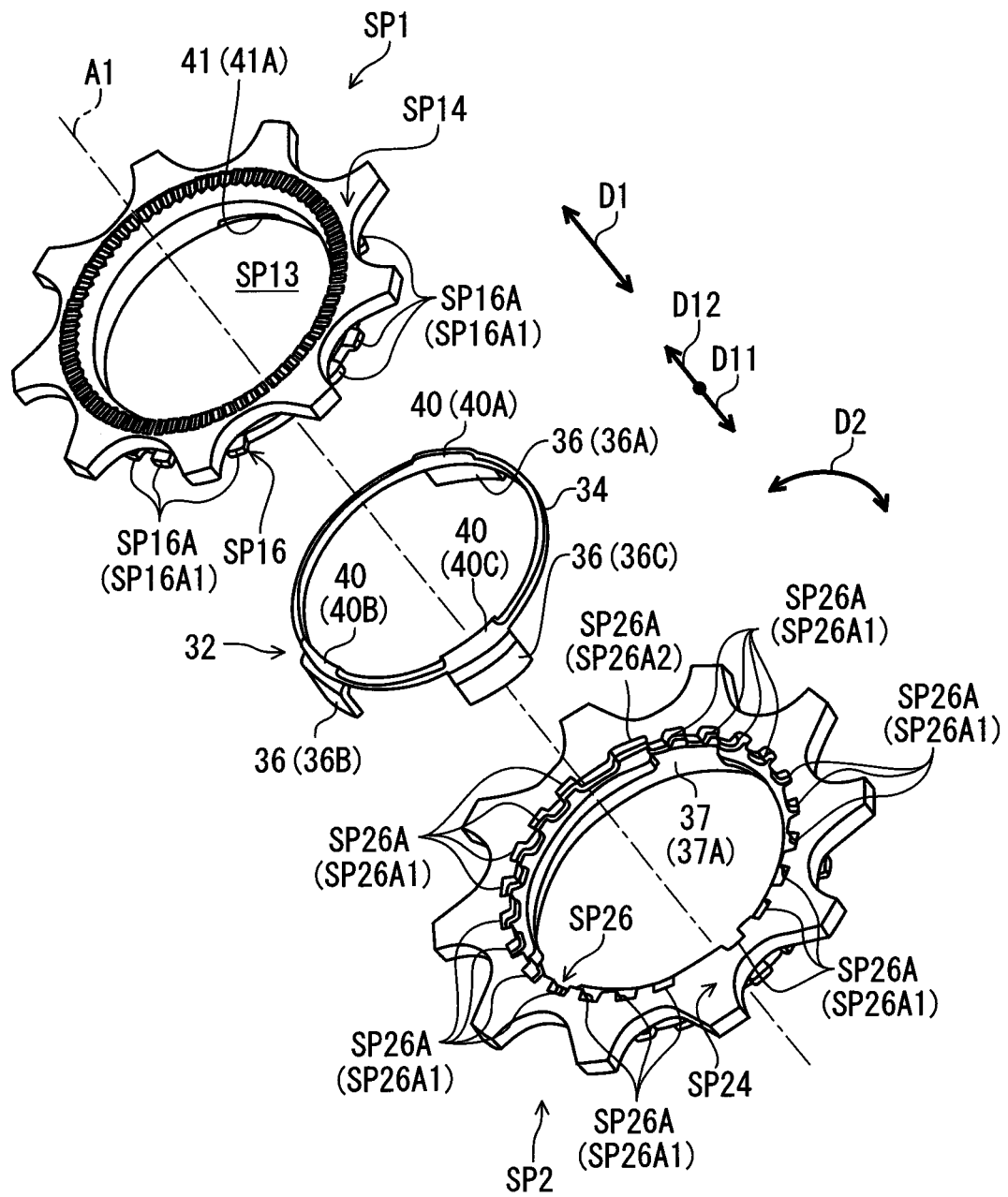
FIG. 10 is another exploded perspective view of the part of the lock device assembly of the rear sprocket assembly illustrated in FIG. 2.

As seen in FIGS. 9 and 10, the second sprocket SP2 includes at least one guide groove 37. The at least one guide portion 36 is configured to be movably provided in the at least one guide groove 37 in the axial direction D1. In the present embodiment, the at least one guide groove 37 includes a first guide groove 37A, a second guide groove 37B, and a third guide groove 37C. The first guide groove 37A, the second guide groove 37B, and the third guide groove 37C are spaced apart from each other in the circumferential direction D2. The first guide portion 36A is configured to be movably provided in the first guide groove 37A in the axial direction D1. The second guide portion 36B is configured to be movably provided in the second guide groove 37B in the axial direction D1. The third guide portion 36C is configured to be movably provided in the third guide groove 37C in the axial direction D1.

The at least one tooth-position maintaining member 32 may include a plurality of tooth-position maintaining members if needed and/or desired. In such embodiments, the tooth-position maintaining members are separate members from each other. Each of the tooth-position maintaining members includes the fixed portion 34 and the at least one guide portion 36. Furthermore, the at least one tooth-position maintaining member 32 and the one of the first sprocket SP1 and the second sprocket SP2 may be integrally provided with each other as a one-piece unitary member if needed and/or desired.

Figure 11:
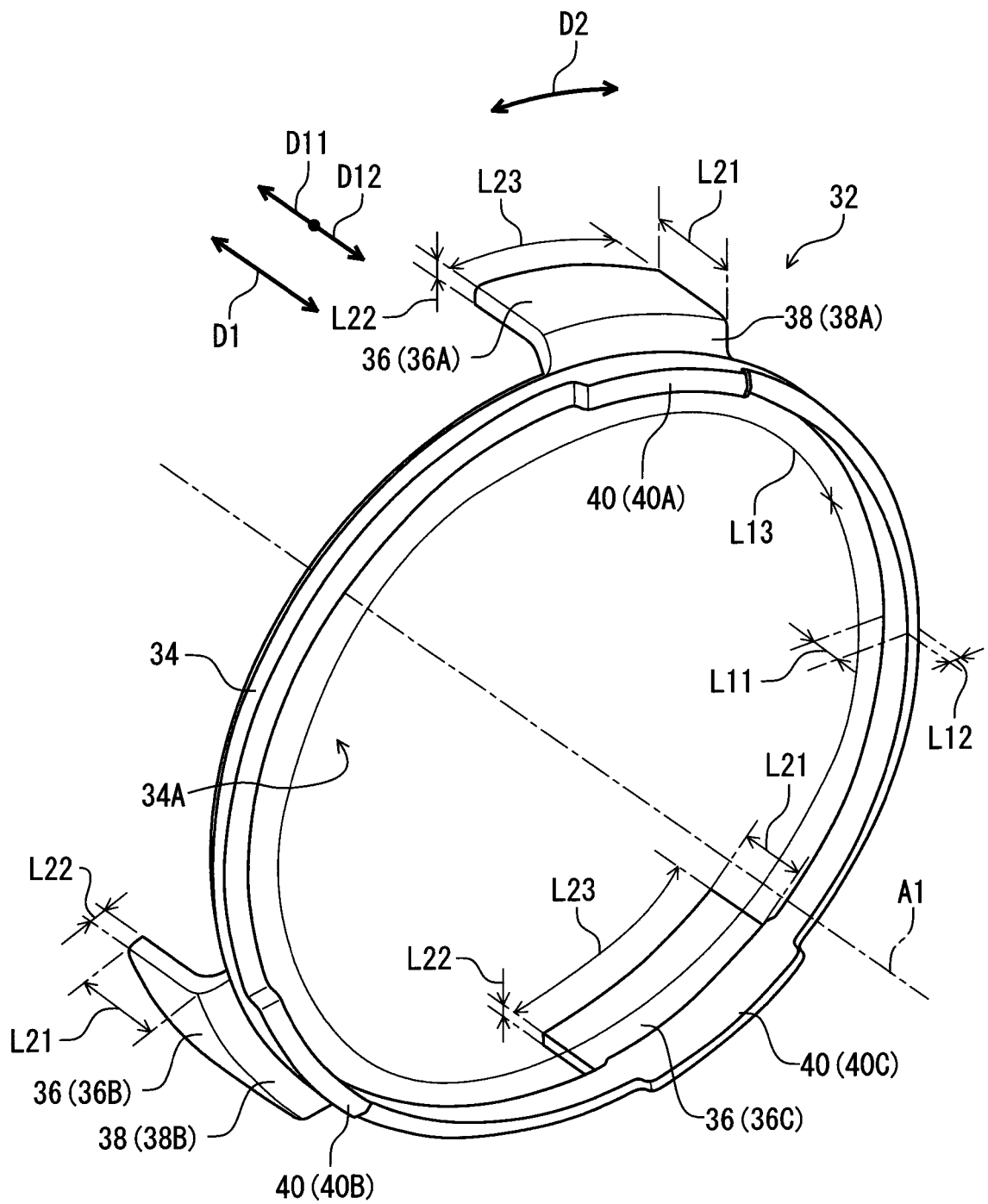
FIG. 11 is a perspective view of a tooth-position maintaining member of the lock device assembly illustrated in FIG. 7.
Figure 12:
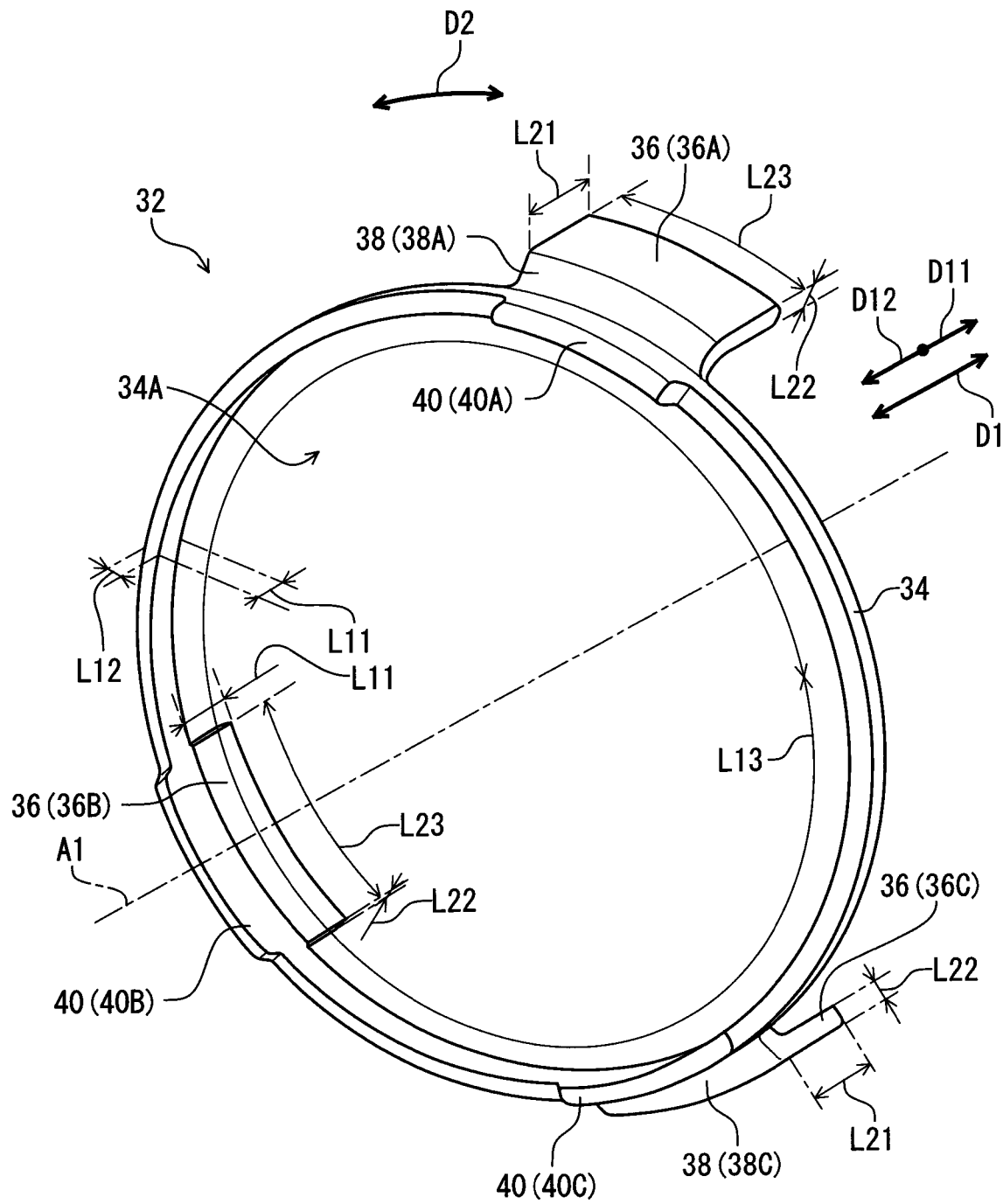
FIG. 12 is another perspective view of the tooth-position maintaining member of the lock device assembly illustrated in FIG. 7.

As seen in FIGS. 11 and 12, the at least one guide portion 36 is disposed radially outwardly from the fixed portion 34 in the radial direction. The first guide portion 36A is disposed radially outwardly from the fixed portion 34 in the radial direction. The second guide portion 36B is disposed radially outwardly from the fixed portion 34 in the radial direction. The third guide portion 36C is disposed radially outwardly from the fixed portion 34 in the radial direction.

The at least one guide portion 36 extends in the axial direction D1. The first guide portion 36A extends in the axial direction D1. The second guide portion 36B extends in the axial direction D1. The third guide portion 36C extends in the axial direction D1.

The at least one guide portion 36 extends in the circumferential direction D2. The first guide portion 36A extends in the circumferential direction D2. The second guide portion 36B extends in the circumferential direction D2. The third guide portion 36C extends in the circumferential direction D2.

The at least one tooth-position maintaining member 32 includes at least one connecting portion 38. The at least one connecting portion 38 connects the at least one guide portion 36 to the fixed portion 34. The at least one connecting portion 38 extends in a direction that intersects with the rotational center axis A1.

The at least one connecting portion 38 includes a plurality of connecting portions 38. The plurality of connecting portions 38 includes a first connecting portion 38A, a second connecting portion 38B, and a third connecting portion 38C. The first connecting portion 38A connects the first guide portion 36A to the fixed portion 34. The second connecting portion 38B connects the second guide portion 36B to the fixed portion 34. The third connecting portion 38C connects the third guide portion 36C to the fixed portion 34.

The first connecting portion 38A extends from the fixed portion 34 to the first guide portion 36A in the axial direction D1. The first connecting portion 38A extends from the fixed portion 34 to the first guide portion 36A in a first axial direction D11. The first axial direction D11 is parallel to the axial direction D1. The first connecting portion 38A extends radially outwardly from the fixed portion 34 to the first guide portion 36A. The first guide portion 36A extends from the first connecting portion 38A in the first axial direction D11.

The second connecting portion 38B extends from the fixed portion 34 to the second guide portion 36B in the axial direction D1. The second connecting portion 38B extends from the fixed portion 34 to the second guide portion 36B in the first axial direction D11. The second connecting portion 38B extends radially outwardly from the fixed portion 34 to the second guide portion 36B. The second guide portion 36B extends from the second connecting portion 38B in the first axial direction D11.

The third connecting portion 38C extends from the fixed portion 34 to the third guide portion 36C in the axial direction D1. The third connecting portion 38C extends from the fixed portion 34 to the third guide portion 36C in the first axial direction D11. The third connecting portion 38C extends radially outwardly from the fixed portion 34 to the third guide portion 36C. The third guide portion 36C extends from the third connecting portion 38C in the first axial direction D11.

The fixed portion 34 has a first axial length L11, a first radial length L12 and a first circumferential length L13 with respect to the rotational center axis A1. The first axial length L11 is defined in the axial direction D1. The first radial length L12 is defined in the radial direction. The first circumferential length L13 is defined in the circumferential direction D2.

In the present embodiment, the first circumferential length L13 is larger than the first axial length L11 and the first radial length L12. The first axial length L11 is larger than the first radial length L12. However, the first circumferential length L13 can be smaller than or equal to at least one of the first axial length L11 and the first radial length L12 if needed and/or desired. The first axial length L11 can be smaller than or equal to the first radial length L12 if needed and/or desired.

The at least one guide portion 36 has a second axial length L21, a second radial length L22 and a second circumferential length L23 with respect to the rotational center axis A1. The second axial length L21 is defined in the axial direction D1. The second radial length L22 is defined in the radial direction. The second circumferential length L23 is defined in the circumferential direction D2.

In the present embodiment, the second circumferential length L23 is larger than the second axial length L21 and the second radial length L22. The second axial length L21 is larger than the second radial length L22. The second axial length L21 is equal to or larger than 2 mm. In the present embodiment, the second axial length L21 is 3 mm. However, the second axial length L21 is not limited to the above range and length. The second circumferential length L23 can be smaller than or equal to at least one of the second axial length L21 and the second radial length L22 if needed and/or desired. The second axial length L21 can be smaller than or equal to the second radial length L22 if needed and/or desired.

The tooth-position maintaining member 32 includes at least one protrusion 40. The at least one protrusion 40 is configured to position the tooth-position maintaining member 32 relative to the first sprocket SP1 when the tooth-position maintaining member 32 is attached to the first sprocket SP1. The at least one protrusion 40 is configured to restrict a relative rotation between the tooth-position maintaining member 32 and the first sprocket SP1 in the circumferential direction D2 in a state where the tooth-position maintaining member 32 is fixed to the first sprocket SP1. The at least one protrusion 40 includes a plurality of protrusions 40. The plurality of protrusions 40 includes a first protrusion 40A, a second protrusion 40B, and a third protrusion 40C.

The first protrusion 40A is provided in a circumferential position corresponding to a circumferential position of the first guide portion 36A. The first protrusion 40A protrudes from the fixed portion 34 in the axial direction D1. The first protrusion 40A protrudes from the fixed portion 34 in a second axial direction D12 which is an opposite direction of the first axial direction D11. The second axial direction D12 is parallel to the first axial direction D11. The first protrusion 40A can be offset from the first guide portion 36A in the circumferential direction D2 if needed and/or desired. The first protrusion 40A can be omitted from the tooth-position maintaining member 32 if needed and/or desired.

The second protrusion 40B is provided in a circumferential position corresponding to a circumferential position of the second guide portion 36B. The second protrusion 40B protrudes from the fixed portion 34 in the axial direction D1. The second protrusion 40B protrudes from the fixed portion 34 in the second axial direction D12. The second protrusion 40B can be offset from the second guide portion 36B in the circumferential direction D2 if needed and/or desired. The second protrusion 40B can be omitted from the tooth-position maintaining member 32 if needed and/or desired.

The third protrusion 40C is provided in a circumferential position corresponding to a circumferential position of the third guide portion 36C. The third protrusion 40C protrudes from the fixed portion 34 in the axial direction D1. The third protrusion 40C protrudes from the fixed portion 34 in the second axial direction D12. The third protrusion 40C can be offset from the third guide portion 36C in the circumferential direction D2 if needed and/or desired. The third protrusion 40C can be omitted from the tooth-position maintaining member 32 if needed and/or desired.

As seen in FIGS. 9 and 10, the first sprocket SP1 includes at least one positioning recess 41. The at least one positioning recess 41 includes a plurality of positioning recesses 41. The plurality of positioning recesses 41 includes a first positioning recess 41A, a second positioning recess 41B, and a third positioning recess 41C. The first protrusion 40A is configured to be provided in the first positioning recess 41A in the state where the tooth-position maintaining member 32 is fixed to the first sprocket SP1. The second protrusion 40B is configured to be provided in the second positioning recess 41B in the state where the tooth-position maintaining member 32 is fixed to the first sprocket SP1. The third protrusion 40C is configured to be provided in the third positioning recess 41C in the state where the tooth-position maintaining member 32 is fixed to the third sprocket SP1.

Figure 13:
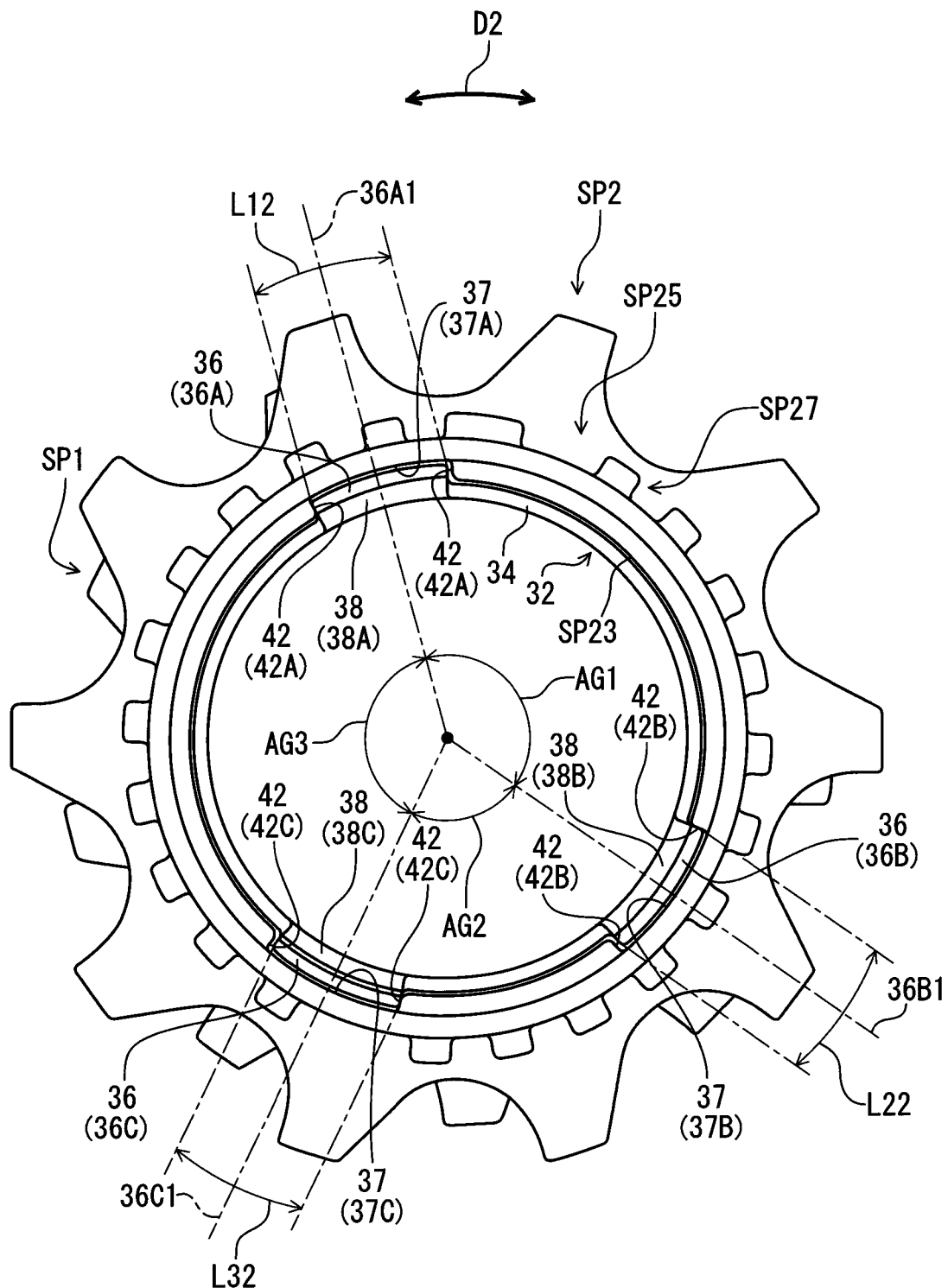
FIG. 13 is a side elevational view of the lock device assembly illustrated in FIG. 7, with a lock device omitted.

As seen in FIG. 13, the first guide portion 36A, the second guide portion 36B and the third guide portion 36C form an isosceles triangle when viewed from the axial direction D1. The first guide portion 36A, the second guide portion 36B and the third guide portion 36C can be circumferential arranged at constant or different intervals if needed and/or desired.

A first circumferential center plane 36A1 is defined to bisect the first circumferential length L12 of the first guide portion 36A as viewed along the rotational center axis A1. The first circumferential center plane 36A1 radially outwardly extends from the rotational center axis A1 to bisect the first circumferential length L12 as viewed along the rotational center axis A1.

A second circumferential center plane 36B1 is defined to bisect the second circumferential length L22 of the second guide portion 36B as viewed along the rotational center axis A1. The second circumferential center plane 36B1 radially outwardly extends from the rotational center axis A1 to bisect the second circumferential length L22 as viewed along the rotational center axis A1.

A third circumferential center plane 36C1 is defined to bisect the third circumferential length L32 of the third guide portion 36C as viewed along the rotational center axis A1. The third circumferential center plane 36C1 radially outwardly extends from the rotational center axis A1 to bisect the third circumferential length L32 as viewed along the rotational center axis A1.

A first circumferential angle AG1 is defined between the first circumferential center plane 36A1 and the second circumferential center plane 36B1 in the circumferential direction D2. A second circumferential angle AG2 is defined between the second circumferential center plane 36B1 and the third circumferential center plane 36C1 in the circumferential direction D2. A third circumferential angle AG3 is defined between the first circumferential center plane 36A1 and the third circumferential center plane 36C1 in the circumferential direction D2.

The first circumferential angle AG1 is equal to the third circumferential angle AG3. The second circumferential angle AG2 is different from the first circumferential angle AG1 and the third circumferential angle AG3. The second circumferential angle AG2 is smaller than the first circumferential angle AG1 and the third circumferential angle AG3. However, the second circumferential angle AG2 can be larger than or equal to at least one of the first circumferential angle AG1 and the third circumferential angle AG3 if needed and/or desired. The first circumferential angle AG1 can be different from the third circumferential angle AG3 if needed and/or desired.

The second circumferential angle AG2 is different from the first circumferential angle AG1 and the third circumferential angle AG3. Thus, the first guide portion 36A, the second guide portion 36B, and the third guide portion 36C define a single circumferential position of the second sprocket SP2 relative to the first sprocket SP1 in a state where the tooth-position maintaining member 32 is fixed to the first sprocket SP1 and a state where the second sprocket SP2 is engaged with the first guide portion 36A, the second guide portion 36B, and the third guide portion 36C.

The second sprocket body SP21 of the second sprocket SP2 has at least one circumferential abutment surface 42. The at least one circumferential abutment surface 42 is configured to abut against the at least one guide portion 36 to maintain the relative position between the plurality of first sprocket teeth SP12 and the plurality of second sprocket teeth SP22 in the circumferential direction D2.

The second sprocket body SP21 has a plurality of first circumferential abutment surfaces 42A configured to abut against the first guide portion 36A to maintain the relative position between the plurality of first sprocket teeth SP12 and the plurality of second sprocket teeth SP22 in the circumferential direction D2. The first guide portion 36A is provided between the first circumferential abutment surfaces 42A in the circumferential direction D2 in the mounting state. The first circumferential abutment surfaces 42A define the first guide groove 37A.

The second sprocket body SP21 has a plurality of second circumferential abutment surfaces 42B configured to abut against the second guide portion 36B to maintain the relative position between the plurality of first sprocket teeth SP12 and the plurality of second sprocket teeth SP22 in the circumferential direction D2. The second guide portion 36B is provided between the second circumferential abutment surfaces 42B in the circumferential direction D2 in the mounting state. The second circumferential abutment surfaces 42B define the second guide groove 37B.

The second sprocket body SP21 has a plurality of third circumferential abutment surfaces 42C configured to abut against the third guide portion 36C to maintain the relative position between the plurality of first sprocket teeth SP12 and the plurality of second sprocket teeth SP22 in the circumferential direction D2. The third guide portion 36C is provided between the third circumferential abutment surfaces 42C in the circumferential direction D2 in the mounting state. The third circumferential abutment surfaces 42C define the third guide groove 37C.

Figure 14:
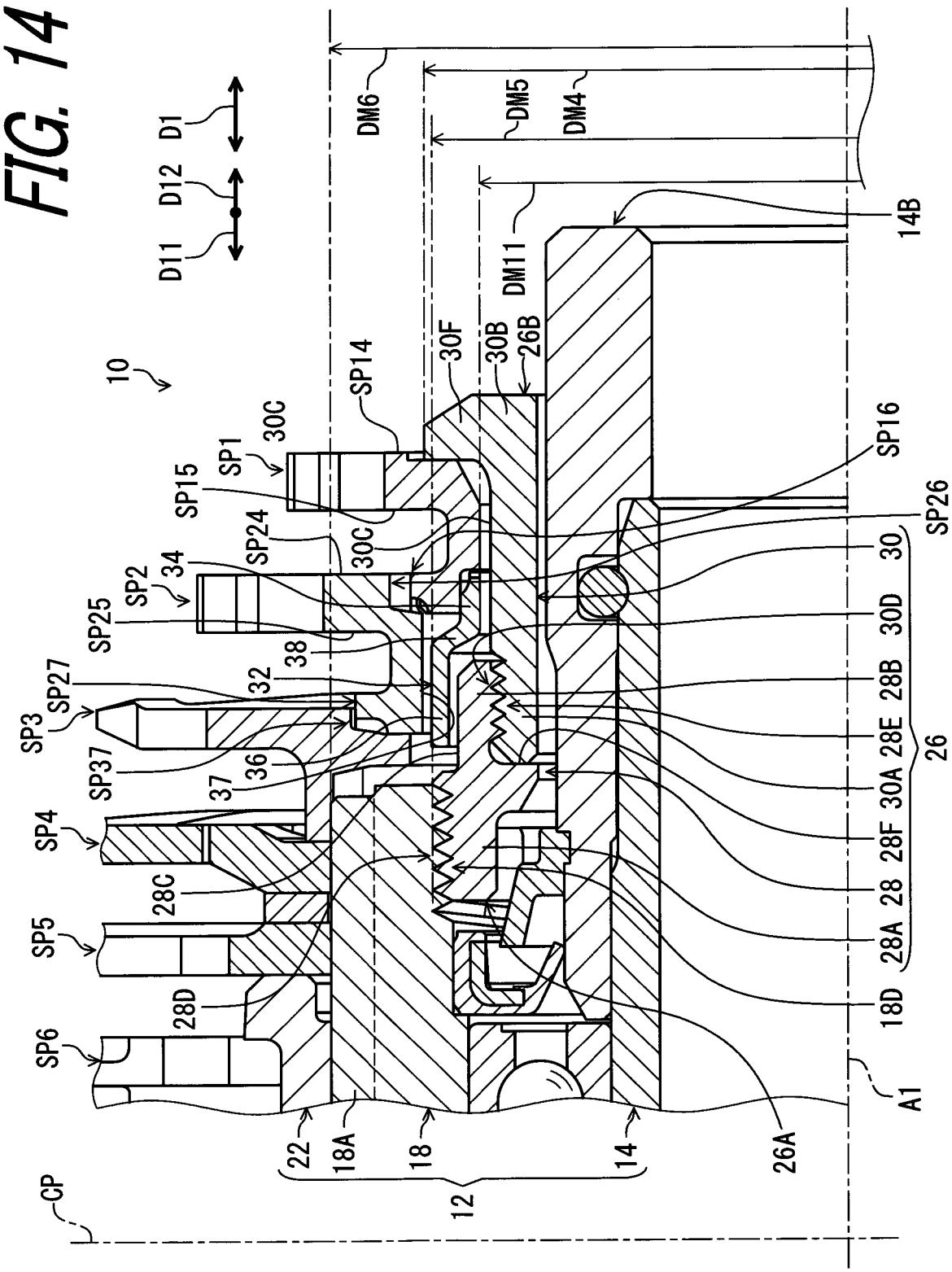
FIG. 14 is another partial cross-sectional view of the rear sprocket assembly and the rear hub assembly illustrated in FIG. 2.

As seen in FIG. 14, the first lock member 28 includes a first axial end 28A and a second axial end 28B. The second axial end 28B is opposite to the first axial end 28A in the axial direction D1 with respect to the rotational center axis A1 of the plurality of rear sprockets SP. The first axial end 28A is configured to be detachably attached to the sprocket support body 18 of the rear hub assembly 12 in a mounting state where the plurality of rear sprockets SP is mounted to the rear hub assembly 12.

The first axial end 28A has first external threads 28D. The second axial end 28B has first internal threads 28E. The axially inward end 26A has the first external threads 28D. The first external threads 28D can also be referred to as first threads 28D. The first internal threads 28E can also be referred to as second threads 28E. Thus, the first axial end 28A has the first threads 28D. The second axial end 28B has the second threads 28E. The axially inward end 26A has the first threads 28D.

The first lock member 28 includes a first surface 28C. The first surface 28C radially outwardly faces in the radial direction with respect to the rotational center axis A1. The first surface 28C is adjacent to the first external threads 28D. The first surface 28C extends from the first external threads 28D in the axial direction D1. The first internal threads 28E are provided radially inwardly of the first surface 28C. The first surface 28C is adjacent to the first threads 28D. The first threads 28D of the first lock member 28 extend radially outwardly from the first surface 28C in the radial direction.

The first external threads 28D of the first lock member 28 extend radially outwardly from the first surface 28C in the radial direction. The first external threads 28D of the first lock member 28 are configured to engage with internal threads 18D provided to the sprocket support body 18 of the rear hub assembly 12 in the mounting state. The internal threads 18D is provided to the axial end 18B of the sprocket support body 18. The internal threads 18D can also be referred to as threads 18D. Thus, the first threads 28D are configured to threadedly engage with the threads 18D provided to the sprocket support body 18 of the rear hub assembly 12 in the mounting state where the rear sprocket assembly 10 is mounted to the rear hub assembly 12.

The second lock member 30 includes a third axial end 30A and a fourth axial end 30B. The fourth axial end 30B is opposite to the third axial end 30A in the axial direction D1. The third axial end 30A is configured to be attached to the second axial end 28B of the first lock member 28 in an assembled state where the first sprocket SP1 and the lock device 26 are assembled as one unit. The third axial end 30A is configured to be attached to the second axial end 28B of the first lock member 28 in the assembled state where the smallest sprocket SP1 and the lock device 26 are assembled as one unit. The third axial end 30A is configured to be attached to the second axial end 28B of the first lock member 28 in an assembled state where the lock device 26, the first sprocket SP1, and the second sprocket SP2 are assembled as one unit. The third axial end 30A of the second lock member 30 is configured to be detachably attached to the second axial end 28B of the first lock member 28 in the assembled state where the first or smallest sprocket SP1 and the lock device 26 are assembled as one unit. The third axial end 30A of the second lock member 30 is configured to be detachably attached to the second axial end 28B of the first lock member 28 in the assembled state where the lock device 26, the first sprocket SP1, and the second sprocket SP2 are assembled as one unit.

The third axial end 30A has second external threads 30D. The fourth axial end 30B has at least one radial projection 30F. Namely, the axially outward end 26B has the at least one radial projection 30F. The second external threads 30D can also be referred to as third threads 30D. Thus, the third axial end 30A has the third threads 30D.

The second lock member 30 includes a second surface 30C. The second surface 30C radially outwardly faces in the radial direction. The second surface 30C is adjacent to the second external threads 30D and the at least one radial projection 30F. The second surface 30C is adjacent to the third threads 30D. The second surface 30C is adjacent to the at least one radial projection 30F in the axial direction D1. The second surface 30C is disposed between the third threads 30D and the at least one radial projection 30F. The first surface 28C of the first lock member 28 is disposed radially outwardly from the second surface 30C of the second lock member 30 in the radial direction with respect to the rotational center axis A1 in the assembled state where the first sprocket SP1 and the lock device 26 are assembled as one unit. The first radially minimum portion SP19 of the first sprocket SP1 is disposed radially outwardly of the second surface 30C in the assembled state where the first sprocket SP1 and the lock device 26 are assembled as one unit.

The first internal threads 28E of the first lock member 28 are configured to engage with the second external threads 30D of the second lock member 30. In other words, the third threads 30D are configured to threadedly engage with the second threads 28E of the first lock member 28 in the assembled state where the first sprocket SP1 and the lock device 26 are assembled as one unit. The at least one radial projection 30F of the second lock member 30 extends radially outwardly from the second surface 30C in the radial direction.

The at least one radial projection 30F of the second lock member 30 is configured to abut against the smallest sprocket SP1 of the plurality of rear sprockets SP in the axial direction D1 in the mounting state where the plurality of rear sprockets SP is mounted to the rear hub assembly 12. The at least one radial projection 30F of the second lock member 30 is configured to abut against the smallest sprocket SP1 of the plurality of rear sprockets SP in the axial direction D1 in the mounting state where the plurality of rear sprockets SP and the lock device 26 are mounted to the rear hub assembly 12. Namely, the at least one radial projection 30F of the second lock member 30 is configured to abut against the first sprocket SP1 in the axial direction D1 in the mounting state where the rear sprocket assembly 10 is mounted to the rear hub assembly 12. The at least one radial projection 30F has a flange shape. However, the at least one radial projection 30F may include a plurality of radial projections if needed and/or desired. The at least one radial projection 30F may have shapes other than the flange shape if needed and/or desired.

As seen in FIG. 8, the first axial end 28A of the first lock member 28 includes a first tool engagement profile 28G. In the present embodiment, the first tool engagement profile 28G includes a plurality of first tool engagement recesses 28G1. The first tool engagement recesses 28G1 are circumferentially arranged at constant intervals. However, the structure of the first tool engagement profile 28G is not limited to the first tool engagement recesses 28G1.

As seen in FIG. 7, the fourth axial end 30B of the second lock member 30 includes a second tool engagement profile 30G. In the present embodiment, the at least one radial projection 30F includes the second tool engagement profile 30G. The second tool engagement profile 30G includes a plurality of second tool engagement recesses 30G1. The second tool engagement recesses 30G1 are circumferential arranged at constant intervals. However, the structure of the second tool engagement profile 30G is not limited to the second tool engagement recesses 30G1.

The first tool engagement profile 28G is configured to be engaged with a first tool. The second tool engagement profile 30G is configured to be engaged with a second tool. The first lock member 28 and the second lock member 30 are rotated relative to each other using the first tool and the second tool in a state where the first tool is engaged with the first tool engagement profile 28G and the second tool is engaged with the second tool engagement profile 30G. Thus, the second external threads 30D of the second lock member 30 is screwed into the first internal threads 28E of the first lock member 28.

As seen in FIG. 14, the lock device 26 is configured to dispose the first sprocket SP1 between the first threads 28D of the first lock member 28 and the at least one radial projection 30F of the second lock member 30 in the axial direction D1 in the assembled state where the first sprocket SP1 and the lock device 26 are assembled as one unit. The lock device 26 is configured to dispose the first sprocket SP1 and the second sprocket SP2 between the first external threads 28D of the first lock member 28 and the at least one radial projection 30F of the second lock member 30 in the axial direction D1 in the assembled state where the lock device 26, the first sprocket SP1, and the second sprocket SP2 are assembled as one unit.

The first sprocket SP1 and the second sprocket SP2 are configured to be disposed between the at least one radial projection 30F of the second lock member 30 and the sprocket support body 18 of the rear hub assembly 12 in the axial direction D1 in the mounting state. The first lock member 28 and the second lock member 30 are configured to dispose at least two sprockets of the plurality of rear sprockets SP between the first external threads 28D of the first lock member 28 and the at least one radial projection 30F of the second lock member 30 in the axial direction D1 in the assembled state where the first lock member 28, the second lock member 30, and the at least two sprockets of the plurality of rear sprockets SP are assembled as one unit.

The at least two sprockets of the plurality of rear sprockets SP include the smallest sprocket SP1 and a largest sprocket among the at least two sprockets. In the present embodiment, the first lock member 28 and the second lock member 30 are configured to dispose the first sprocket SP1 and the second sprocket SP2 between the first external threads 28D of the first lock member 28 and the at least one radial projection 30F of the second lock member 30 in the axial direction D1 in the assembled state where the first lock member 28, the second lock member 30, the first sprocket SP1, and the second sprocket SP2 are assembled as one unit. Thus, the at least two sprockets include the first sprocket SP1 and the second sprocket SP2. The first sprocket SP1 can also be referred to as the smallest sprocket SP1 among the at least two sprockets. The second sprocket SP2 can also be referred to as the largest sprocket SP2 among the at least two sprockets. However, the at least two sprockets of the plurality of rear sprockets SP can include other sprockets of the plurality of rear sprockets SP if needed and/or desired.

The first sprocket opening SP13 can also be referred to as a smallest-sprocket opening SP13. The first diameter DM11 of the first sprocket opening SP13 can also be referred to as a smallest-sprocket diameter DM11. Thus, the smallest sprocket SP1 includes the smallest-sprocket opening SP13 having the smallest-sprocket diameter DM11.

The second sprocket opening SP23 can also be referred to as a largest-sprocket opening SP23. The second diameter DM21 of the second sprocket opening SP23 can also be referred to as a largest-sprocket diameter DM21. The largest sprocket SP2 includes the largest-sprocket opening SP23 having the largest-sprocket diameter DM21.

The at least one radial projection 30F has a radially outer diameter DM4. The first external threads 28D has a major diameter DM5. The radially outer diameter DM4 of the at least one radial projection 30F can also be referred to as a radially maximum projection diameter DM4. The major diameter DM5 of the first external threads 28D can also be referred to as a first radially maximum thread diameter DM5. Thus, the at least one radial projection 30F has the radially maximum projection diameter DM4. The first threads 28D have the first radially maximum thread diameter DM5.

The radially outer diameter DM4 of the at least one radial projection 30F is larger than the first diameter DM11 of the first sprocket opening SP13. The major diameter DM5 of the first external threads 28D is larger than the second diameter DM21 of the second sprocket opening SP23. Namely, the radially outer diameter DM4 of the at least one radial projection 30F is larger than the smallest-sprocket diameter DM11. The major diameter DM5 of the first external threads 28D is larger than the largest-sprocket diameter DM21. The first radially minimum diameter DM11 of the first sprocket opening SP13 is smaller than each of the first radially maximum thread diameter DM5 of the first threads 28D and the radially maximum projection diameter DM4 of the at least one radial projection 30F.

The first lock member 28 has an axial contact surface 28F disposed radially inwardly from the first surface 28C. The axial contact surface 28F is configured to contact the third axial end 30A of the second lock member 30 in the assembled state where the first sprocket SP1 and the lock device 26 are assembled as one unit. The axial contact surface 28F is configured to contact the third axial end 30A of the second lock member 30 in the assembled state where the lock device 26, the first sprocket SP1, and the second sprocket SP2 are assembled as one unit. The axial contact surface 28F is configured to contact the third axial end 30A of the second lock member 30 in the assembled state where the first lock member 28, the second lock member 30, and the at least two sprockets of the plurality of rear sprockets SP are assembled as one unit. The axial contact surface 28F is configured to contact the third axial end 30A of the second lock member 30 in the assembled state where the first lock member 28, the second lock member 30, the first sprocket SP1, and the second sprocket SP2 are assembled as one unit.

The first sprocket SP1 has a first axially outward surface SP14 and a first axially inward surface SP15. The first axially outward surface SP14 and the first axially inward surface SP15 face toward opposite directions to each other in the axial direction D1. The first axially inward surface SP15 is configured to face toward an axial center plane CP of the human-powered vehicle 2 in the mounting state where the rear sprocket assembly 10 is mounted to the rear hub assembly 12.

The second sprocket SP2 has a second axially outward surface SP24 and a second axially inward surface SP25. The second axially outward surface SP24 and the second axially inward surface SP25 face toward opposite directions to each other in the axial direction D1. The second axially inward surface SP25 is configured to face toward the axial center plane CP of the human-powered vehicle 2 in the mounting state.

As seen in FIGS. 9 and 10, the first sprocket SP1 includes a first axially inwardly torque transmitting profile SP16 provided to the first axially inward surface SP15. The second sprocket SP2 includes a second axially outwardly torque transmitting profile SP26 provided to the second axially outward surface SP24. The first axially inwardly torque transmitting profile SP16 is configured to engage with the second axially outwardly torque transmitting profile SP26 in a torque-transmitting manner. The first axially inwardly torque transmitting profile SP16 is configured to, in a torque-transmitting manner, engage with the second axially outwardly torque transmitting profile SP26 of the second sprocket SP2 adjacent to the first sprocket SP1 without another sprocket between the first sprocket SP1 and the second sprocket SP2 in the axial direction D1 in the mounting state where the rear sprocket assembly 10 is mounted to the rear hub assembly 12.

As seen in FIG. 9, the first axially inwardly torque transmitting profile SP16 includes a plurality of first teeth SP16A. The plurality of first teeth SP16A includes a plurality of first teeth SP16A1 and a first tooth SP16A2. The first tooth SP16A2 has a shape and/or size which is different from a shape and/or size of the plurality of first teeth SP16A1. In the present embodiment, the first tooth SP16A2 has a circumferential width which is larger than a circumferential width of the first tooth SP16A1.

As seen in FIG. 10, the second axially outwardly torque transmitting profile SP26 includes a plurality of second recesses SP26A. The plurality of second recesses SP26A includes a plurality of second recesses SP26A1 and a second recess SP26A2. The second recess SP26A2 has a shape and/or size different from a shape and/or size of the plurality of second recesses SP26A1. In the present embodiment, the second recess SP26A2 has a circumferential width which is larger than a circumferential width of the second recess SP26A1.

As seen in FIGS. 9 and 10, the first teeth SP16A of the first sprocket SP1 are configured to respectively engage with the second recesses SP26A of the second sprocket SP2 in a torque transmitting manner. In the present embodiment, the first teeth SP16A1 of the first sprocket SP1 are configured to respectively engage with the second recesses SP26A1 of the second sprocket SP2. The first tooth SP16A2 of the first sprocket SP1 is configured to engage with the second recess SP26A2 of the second sprocket SP2. The first tooth SP16A2 is configured not to engage with the second recess SP26A1 since the circumferential width of the first tooth SP16A2 is larger than the circumferential width of the second recess SP26A1. Thus, the first tooth SP16A2 and the second recess SP26A2 define a single circumferential position of the first sprocket SP1 relative to the second sprocket SP2.

Figure 15:
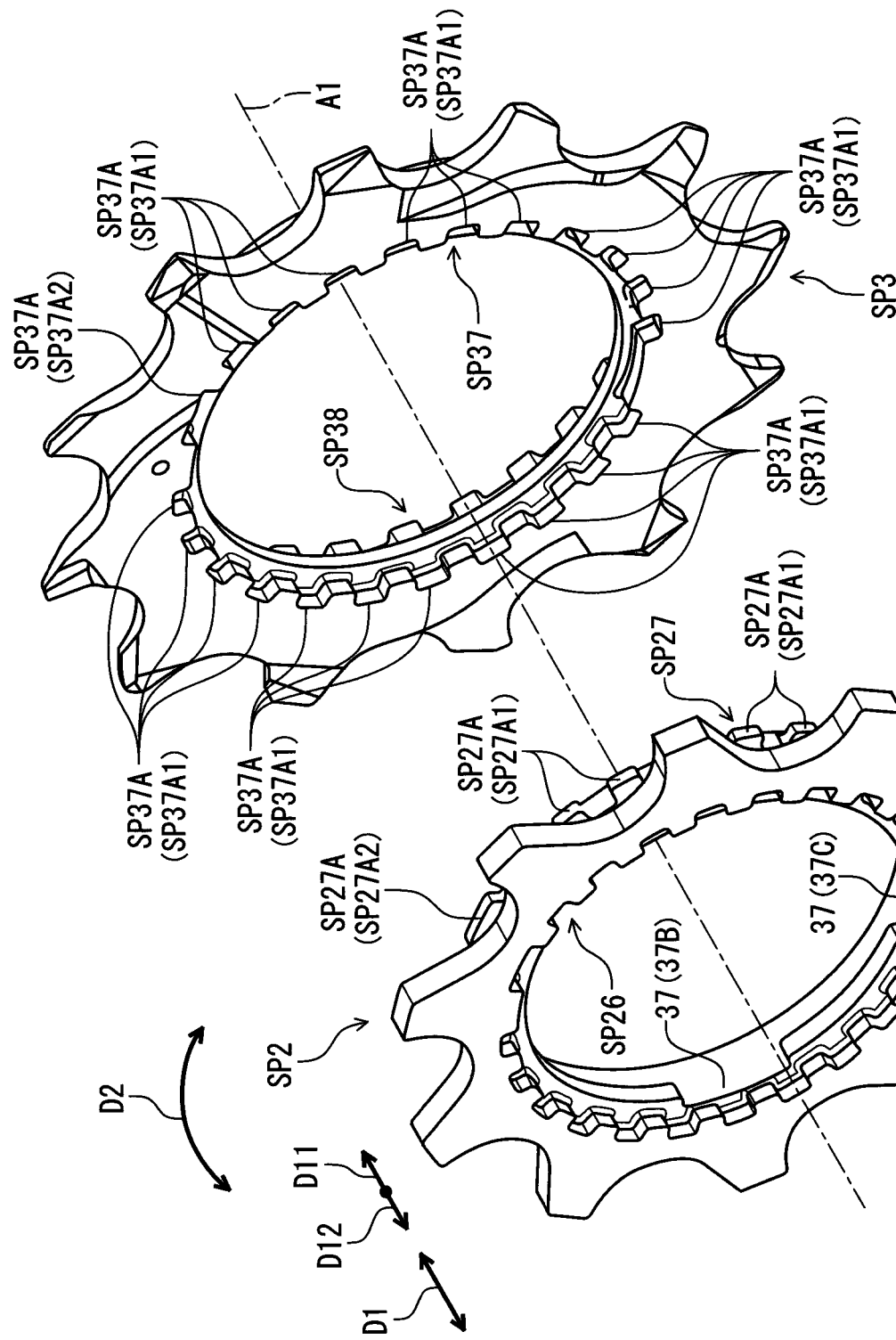
FIG. 15 is a perspective view of sprockets of the rear sprocket assembly illustrated in FIG. 2.

As seen in FIGS. 9 and 15, the second sprocket SP2 includes a second axially inwardly torque transmitting profile SP27 provided to the second axially inward surface SP25. The second axially inwardly torque transmitting profile SP27 is configured to engage with one of a torque transmitting profile provided to the third sprocket SP3 and a torque transmitting profile provided to the sprocket support body 18 of the rear hub assembly 12 in a torque-transmitting manner.

In the present embodiment, as seen in FIG. 15, the second axially inwardly torque transmitting profile SP27 is configured to engage with a torque transmitting profile SP37 provided to the third sprocket SP3 in a torque-transmitting manner. However, the second axially inwardly torque transmitting profile SP27 can be configured to engage with a torque transmitting profile provided to the sprocket support body 18 in a torque-transmitting manner if needed and/or desired.

As seen in FIG. 9, the second axially inwardly torque transmitting profile SP27 includes a plurality of second additional teeth SP27A. The plurality of second additional teeth SP27A includes a plurality of second additional teeth SP27A1 and a second additional tooth SP27A2. The second additional tooth SP27A2 that has a different shape and/or size from the other of the plurality of second additional teeth SP27A1. In the present embodiment, the second additional tooth SP27A2 has a circumferential width which is larger than a circumferential width of the second additional tooth SP27A1.

As seen in FIG. 15, the torque transmitting profile SP37 includes a plurality of third recesses SP37A. The plurality of third recesses SP37A includes a plurality of third recesses SP37A1 and a third recess SP37A2. The third recess SP37A2 has a shape and/or size different from a shape and/or size of the plurality of third recesses SP37A1. In the present embodiment, the third recess SP37A2 has a circumferential width which is larger than a circumferential width of the third recess SP37A1.

As seen in FIGS. 9 and 15, the second teeth SP27A of the second sprocket SP2 are configured to respectively engage with the third recesses SP37A of the third sprocket SP3. In the present embodiment, the second teeth SP27A1 of the second sprocket SP2 are configured to respectively engage with the third recesses SP37A1 of the third sprocket SP3. The second additional tooth SP27A2 of the second sprocket SP2 is configured to engage with the third recess SP37A2 of the third sprocket SP3. The second additional tooth SP27A2 is configured not to engage with the third recess SP37A1 since the circumferential width of the second additional tooth SP27A2 is larger than the circumferential width of the third recess SP37A1. Thus, the second additional tooth SP27A2 and the third recess SP37A2 define the rotational position of the second sprocket SP2 relative to the third sprocket SP3.

As seen in FIGS. 6 and 15, the third sprocket SP3 includes an additional torque transmitting profile SP38. The additional torque transmitting profile SP38 is configured to engage with the plurality of external spline teeth 18A of the sprocket support body 18 in a torque transmitting manner in the present embodiment. The additional torque transmitting profile SP38 and the plurality of external spline teeth 18A define a single circumferential position of the third sprocket SP3 relative to the sprocket support body 18. Rotational force is transmitted from the first sprocket SP1 to the sprocket support body 18 via the second sprocket SP2 and the third sprocket SP3. Rotational force is transmitted from the second sprocket SP2 to the sprocket support body 18 via the third sprocket SP3.

The assembly procedure in which the first sprocket SP1, the second sprocket SP2, the lock device 26, and the tooth-position maintaining member 32 are assembled to the rear hub assembly 12 will be described below referring FIGS. 7 to 10 and 16 to 18.

Figure 16:
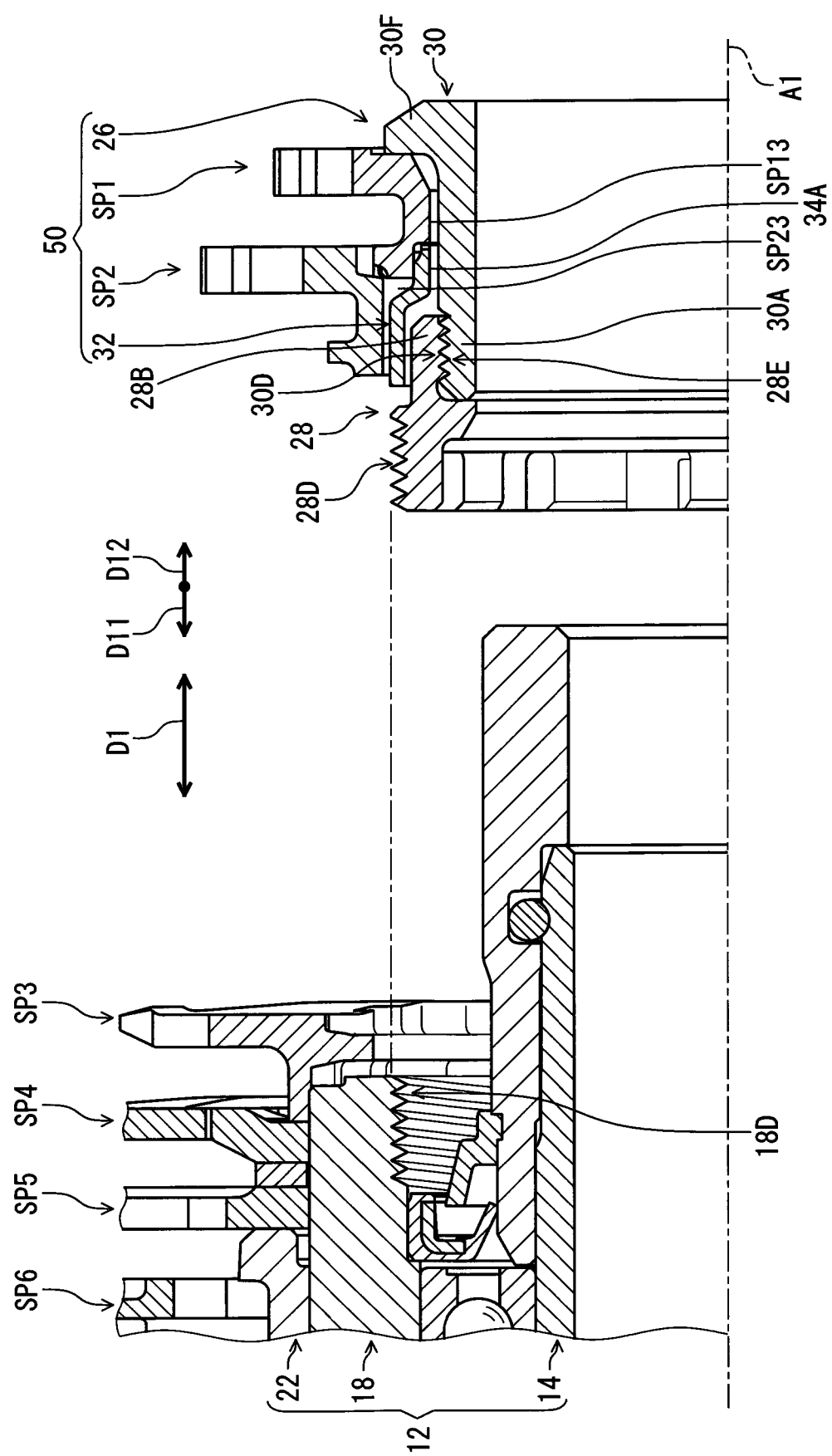
FIG. 16 is a cross-sectional view of the rear sprocket assembly and the rear hub assembly illustrated in FIG. 2 for showing an assembly procedure.

As seen in FIG. 16, the first sprocket SP1, the second sprocket SP2, the lock device 26, and the tooth-position maintaining member 32 are assembled as a lock device assembly 50 before the first sprocket SP1 and the second sprocket SP2 are assembled to the rear hub assembly 12. The lock device assembly 50 includes the first sprocket SP1, the second sprocket SP2, the lock device 26, and the tooth-position maintaining member 32.

The lock device 26 is configured so that the first sprocket SP1 is slidable relative to the lock device 26 in the axial direction D1 in the assembled state and before the mounting state where the rear sprocket assembly 10 is mounted to the rear hub assembly 12. The lock device 26 is configured so that the adjacent sprocket SP2 is slidable in the axial direction D1 relative to the lock device 26 in a space provided radially outwardly of the first surface 28C and the second surface 30C in the assembled state and before the mounting state where the plurality of rear sprockets SP is mounted to the rear hub assembly 12.

In the present embodiment, the first sprocket SP1 is slidable between the first threads 28D of the first lock member 28 and the at least one radial projection 30F of the second lock member 30 in the axial direction D1 in the assembled state where the rear sprocket assembly 10 is mounted to the rear hub assembly 12. The first sprocket SP1 is slidable between the first threads 28D of the first lock member 28 and the at least one radial projection 30F of the second lock member 30 in the axial direction D1 in the assembled state before the mounting state where the rear sprocket assembly 10 is mounted to the rear hub assembly 12. However, the lock device 26 can be configured so that the smallest sprocket SP1 is static relative to the lock device 26 in the axial direction D1 in the assembled state where the plurality of rear sprockets SP is mounted to the rear hub assembly 12 if needed and/or desired. The lock device 26 can be configured so that the smallest sprocket SP1 is static relative to the lock device 26 in the axial direction D1 in the assembled state before the mounting state where the plurality of rear sprockets SP is mounted to the rear hub assembly 12 if needed and/or desired. In such embodiments, the lock device 26 is configured to restrict an axial movement of the smallest sprocket SP1 relative to the lock device 26 in both the first axial direction D11 and the second axial direction D12 in the assembled state before the mounting state. The at least one radial projection 30F of the second lock member 30 is in contact with the first sprocket SP1 to restrict an axial movement of the first sprocket SP1 and the tooth-position maintaining member 32 relative to the lock device 26 in the second axial direction D12. The second axial end 28B of the first lock member 28 is in contact with the tooth-position maintaining member 32 to restrict an axial movement of the first sprocket SP1 and the tooth-position maintaining member 32 relative to the lock device 26 in the first axial direction D11.

As seen in FIGS. 9 and 10, for example, the fixed portion 34 of the tooth-position maintaining member 32 is inserted into the first sprocket opening SP13 of the first sprocket SP1. At this time, the first protrusion 40A, the second protrusion 40B, and the third protrusion 40C are inserted into the first positioning recess 41A, the second positioning recess 41B, and the third positioning recess 41C. Thus, the tooth-position maintaining member 32 is fixed to the first sprocket SP1 in the single circumferential position.

The first guide portion 36A, the second guide portion 36B, and the third guide portion 36C are inserted into the first guide groove 37A, the second guide groove 37B, and the third guide groove 37C of the second sprocket SP2. Thus, the second sprocket SP2 is assembled to the first sprocket SP1 via the tooth-position maintaining member 32 in the single circumferential position relative to the first sprocket SP1.

As seen in FIG. 16, the third axial end 30A of the second lock member 30 is inserted into the first sprocket opening SP13, the opening 34A of the tooth-position maintaining member 32, and the second sprocket opening SP23. The second external threads 30D of the second lock member 30 is screwed into the first internal threads 28E of the first lock member 28. The first lock member 28 and the second lock member 30 are rotated relative to each other using the first tool and the second tool until the third axial end 30A comes into contact with the axial contact surface 28F of the first lock member 28. Thus, the first sprocket SP1, the second sprocket SP2, the lock device 26, and the tooth-position maintaining member 32 are assembled as the lock device assembly 50.

Figure 17:
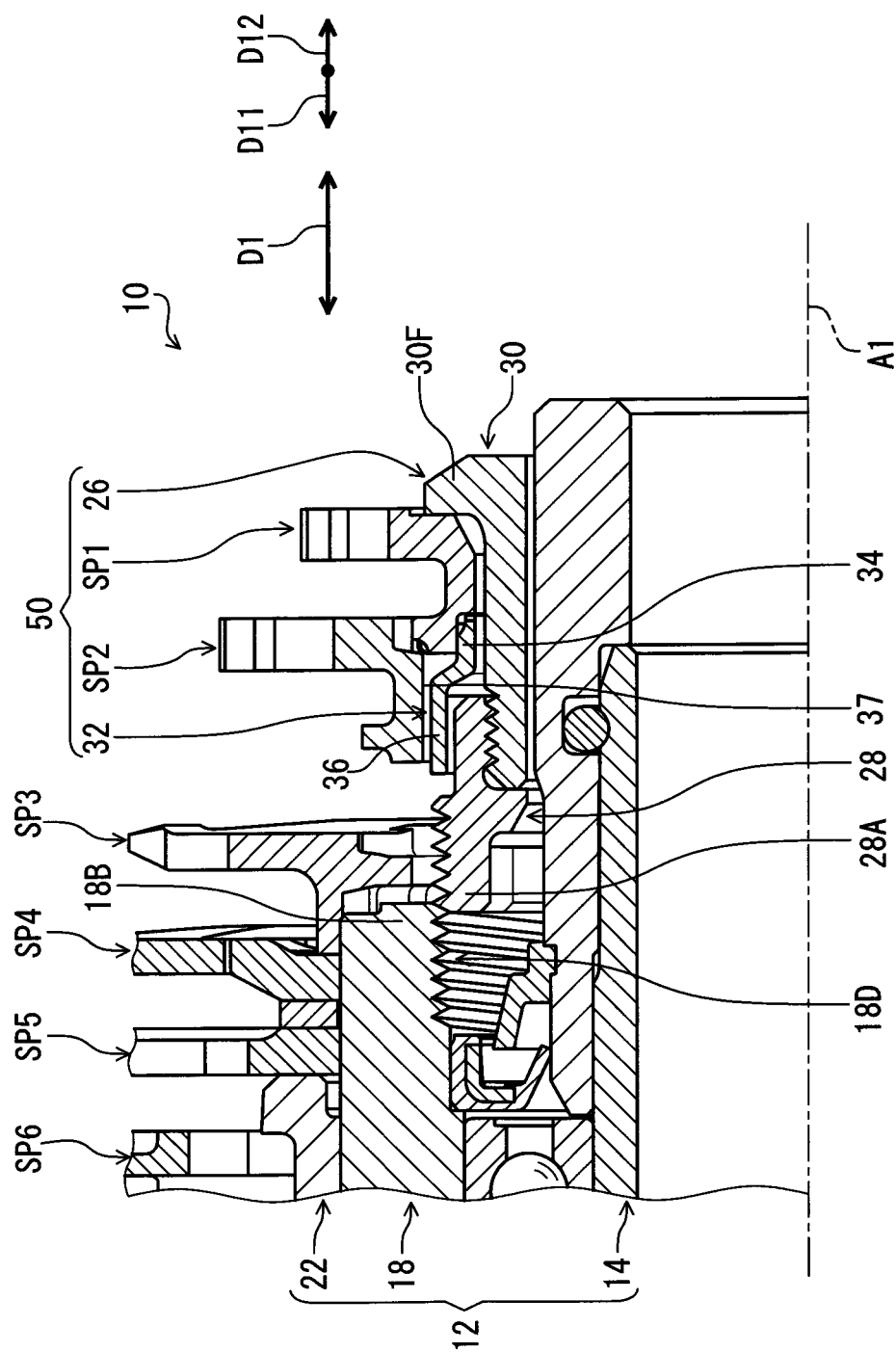
FIG. 17 is a cross-sectional view of the rear sprocket assembly and the rear hub assembly illustrated in FIG. 2 for showing the assembly procedure.

As seen in FIG. 17, the first axial end 28A of the first lock member 28 comes into contact with the axial end 18B of the sprocket support body 18 when the lock device assembly 50 is assembled to the sprocket support body 18.

Figure 18:
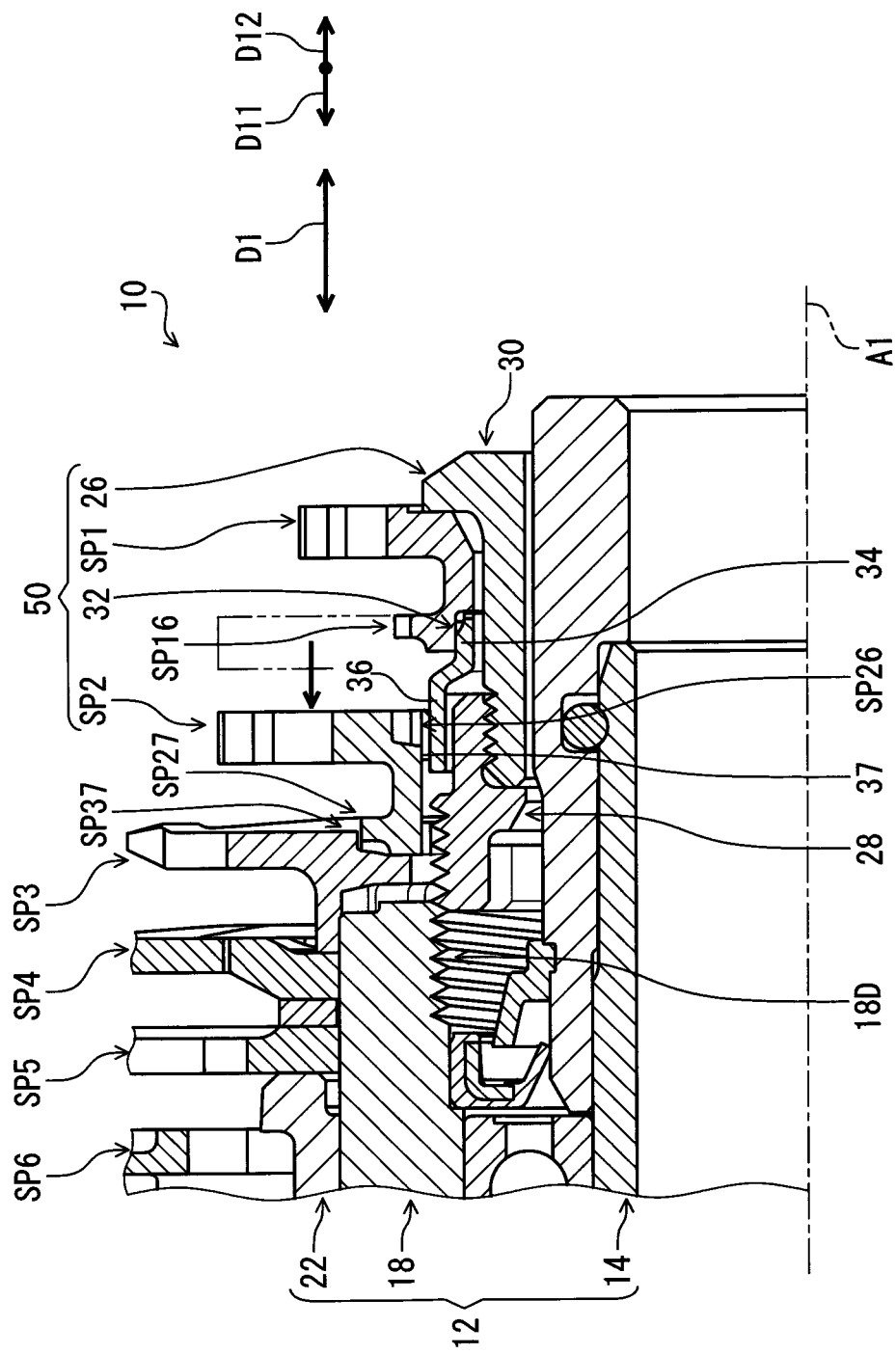
FIG. 18 is a cross-sectional view of the rear sprocket assembly and the rear hub assembly illustrated in FIG. 2 for showing the assembly procedure.

As seen in FIG. 18, the second sprocket SP2 is moved toward the third sprocket SP3 to bring the second axially inwardly torque transmitting profile SP27 into engagement with the torque transmitting profile SP37 of the third sprocket SP3. The second sprocket SP2 is rotated relative to the sprocket support body 18 about the rotational center axis A1 to adjust the rotational position of the second axially inwardly torque transmitting profile SP27 relative to the torque transmitting profile SP37 of the third sprocket SP3, specifically such that the second additional tooth SP27A2 of the second sprocket SP2 engages with the third recess SP37A2 of the third sprocket SP3. Since the tooth-position maintaining member 32 is configured to couple the first sprocket SP1 and the second sprocket SP2 such that the second sprocket SP2 is slidable relative to the first sprocket SP1 in the axial direction D1, the first sprocket SP1 and the tooth-position maintaining member 32 are rotated relative to the sprocket support body 18 about the rotational center axis A1 along with the second sprocket SP2 in response to the rotation of the second sprocket SP2. Thus, the first sprocket SP1, the second sprocket SP2, and the third sprocket SP3 are positioned relative to each other in the predetermined rotational positions in a state where the second axially inwardly torque transmitting profile SP27 is engaged with the torque transmitting profile SP37 of the third sprocket SP3.

As seen in FIGS. 14 and 17, the lock device 26 is rotated relative to the sprocket support body 18 about the rotational center axis A1 using the second tool such that the first external threads 28D of the first lock member 28 is screwed into the internal threads 18D of the sprocket support body 18. The rotational position between the second sprocket SP2 and the third sprocket SP3 is maintained relative to the sprocket support body 18 while the lock device 26 is rotated relative to the sprocket support body 18 since the second axially inwardly torque transmitting profile SP27 of the second sprocket SP2 is engaged with the torque transmitting profile SP37 of the third sprocket SP3. The rotational position between the first sprocket SP1 and the second sprocket SP2 is maintained relative to the sprocket support body 18 while the lock device 26 is rotated relative to the sprocket support body 18 since the guide portions 36 of the tooth-position maintaining member 32 are engaged with the guide grooves 37 of the second sprocket SP2. Thus, the first axially inwardly torque transmitting profile SP16 smoothly comes into engagement with the second axially outwardly torque transmitting profile SP26 when the lock device 26 is tightened using the second tool. The first sprocket SP1 and the second sprocket SP2 are held between the radial projection 30F and the third sprocket SP3 in the axial direction D1 when the lock device 26 is tightened using the tool. Thus, the first sprocket SP1 and the second sprocket SP2 are mounted to the sprocket support body 18 of the rear hub assembly 12 using the lock device 26 and the tooth-position maintaining member 32.

The structures of the first sprocket SP1, the second sprocket SP2, and the tooth-position maintaining member 32 can be applied to other rear sprocket assemblies. For example, the structures of the first sprocket SP1, the second sprocket SP2, and the tooth-position maintaining member 32 can be applied to rear sprocket assemblies 210, 310, and 410 illustrated in FIGS. 19 to 21. The rear sprocket assemblies 210, 310, and 410 illustrated in FIGS. 19 to 21 have substantially the same structure as the structure of the rear sprocket assembly 10. The sprocket carrier 22 of the embodiment is omitted from the rear sprocket assemblies 210, 310, and 410.

Figure 19:
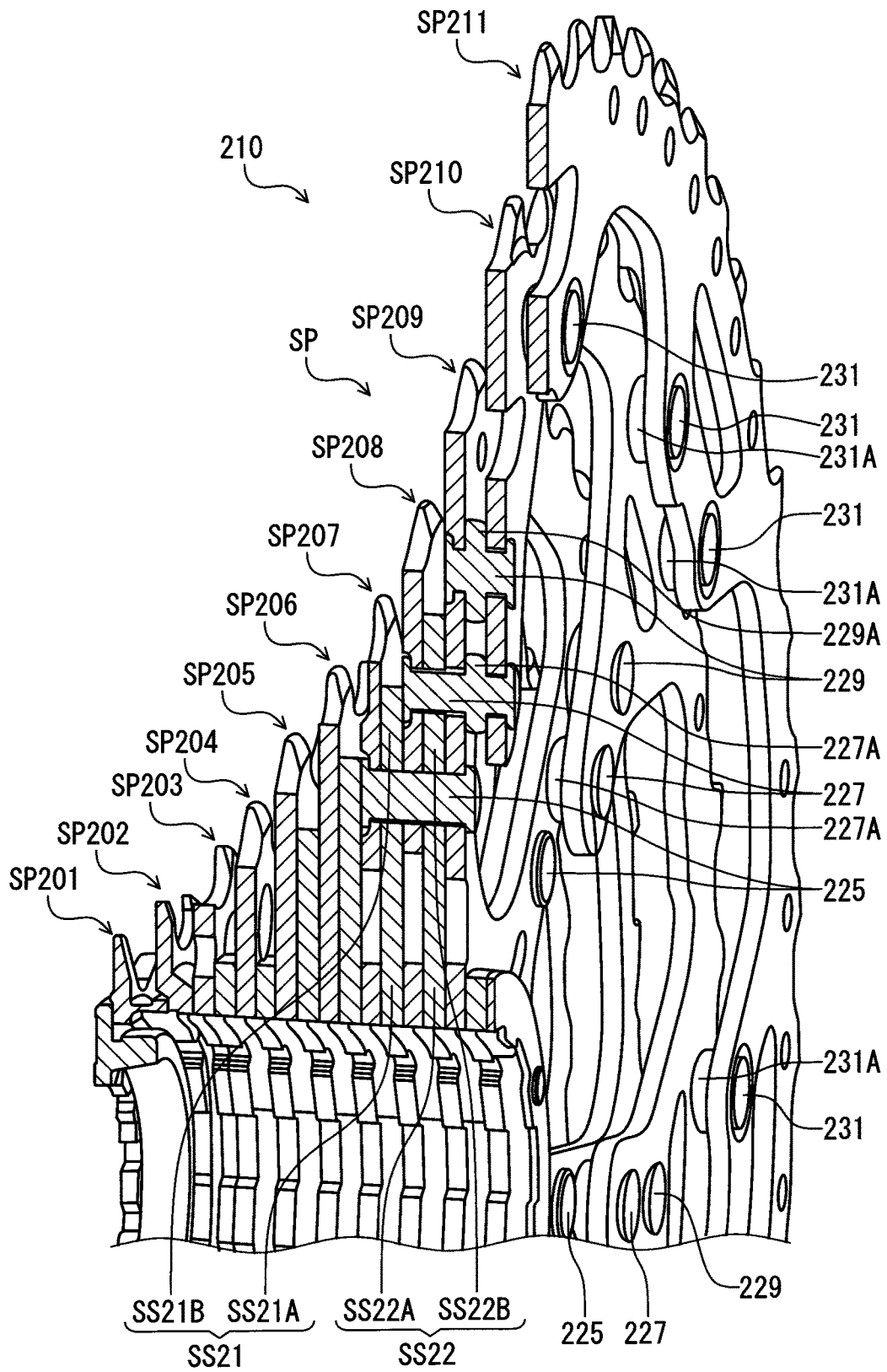
FIG. 19 is a perspective cross-sectional view of a rear sprocket assembly in accordance with a modification.

As seen in FIG. 19, the sprockets SP of the rear sprocket assembly 210 includes first to eleventh sprockets SP201 to SP211. The seventh to ninth sprockets SP207 to SP209 are secured to each other with fasteners 225. The rear sprocket assembly 210 includes spacers SS21 and SS22. The spacer SS21 is provided between the seventh sprocket SP207 and the eighth sprocket SP208. The spacer SS22 is provided between the eighth sprocket SP208 and the ninth sprocket SP209. The seventh to ninth sprockets SP207 to SP209 and the spacers SS21 and SS22 are secured to each other with the fasteners 225.

The spacer SS21 includes a ring SS21A and a plurality of arms SS21B extending radially outwardly from the ring SS21A. The arms SS21B are circumferentially arranged. The spacer SS22 includes a ring SS22A and a plurality of arms SS22B extending radially outwardly from the ring SS22A. The arms SS22B are circumferentially arranged. The seventh to ninth sprockets SP207 to SP209 and the arms SS21B and SS22B are secured to each other with the fasteners 225.

The eighth to tenth sprockets SP208 to SP210 are secured to each other with fasteners 227. The spacer SS22 is provided between the eighth sprocket SP208 and the ninth sprocket SP209. The eighth to tenth sprockets SP208 to SP210 and the arms SS22B are secured to each other with the fasteners 227. Each of the fasteners 227 includes a spacer 227A. The spacers 227A of the fasteners 227 are provided between the ninth sprocket SP209 and the tenth sprocket SP210.

The ninth and tenth sprockets SP209 and SP210 are secured to each other with fasteners 229. Each of the fasteners 229 includes a spacer 229A. The spacers 229A of the fasteners 229 are provided between the ninth sprocket SP209 and the tenth sprocket SP210.

The tenth and eleventh sprockets SP210 and SP211 are secured to each other with fasteners 231. Each of the fasteners 231 includes a spacer 231A. The spacers 231A of the fasteners 231 are provided between the tenth sprocket SP210 and the eleventh sprocket SP211. Thus, the seventh to eleventh sprockets SP207 to 211 are integrally coupled with the fasteners 225, 227, 229, and 231.

Figure 20:
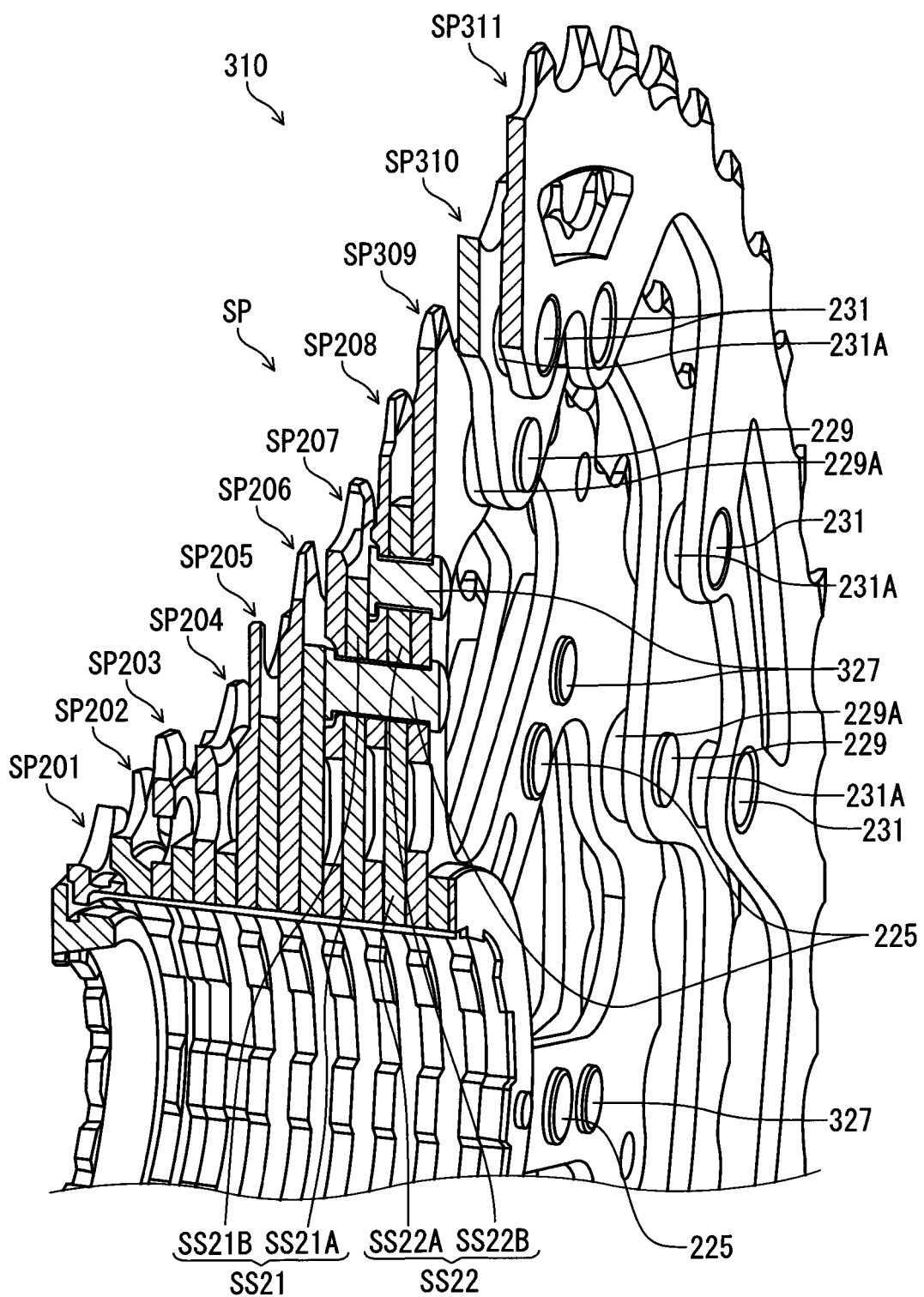
FIG. 20 is a perspective cross-sectional view of a rear sprocket assembly in accordance with another modification.

As seen in FIG. 20, the rear sprocket assembly 310 has substantially the same structure as the structure of the rear sprocket assembly 210. The sprockets SP of the rear sprocket assembly 310 includes the first to eighth sprockets SP201 to SP208 and ninth to eleventh sprockets SP309 to SP311. The sprockets SP309 to SP311 has substantially the same structure as the structure of the sprockets SP209 to SP211.

The seventh, eighth, and ninth sprockets SP207, SP208, and SP309 are secured to each other with the fasteners 225. The spacer SS21 is provided between the seventh sprocket SP207 and the eighth sprocket SP208. The spacer SS22 is provided between the eighth sprocket SP208 and the ninth sprocket SP309. The seventh, eighth, and ninth sprockets SP207, SP208, and SP309 and the spacers SS21 and SS22 are secured to each other with the fasteners 225. The seventh, eighth, and ninth sprockets SP207, SP208, and SP309 and the arms SS21B and SS22B are secured to each other with the fasteners 225.

The eighth and ninth sprockets SP208 and SP309 are secured to each other with fasteners 327. The spacer SS22 is provided between the eighth sprocket SP208 and the ninth sprocket SP309. The eighth and ninth sprockets SP208 and SP309 and the arms SS22B are secured to each other with the fasteners 327.

The ninth and tenth sprockets SP309 and SP310 are secured to each other with the fasteners 229. The spacers 229A of the fasteners 229 are provided between the ninth sprocket SP309 and the tenth sprocket SP310.

The tenth and eleventh sprockets SP310 and SP311 are secured to each other with the fasteners 231. The spacers 231A of the fasteners 231 are provided between the tenth sprocket SP310 and the eleventh sprocket SP311. Thus, the seventh to eleventh sprockets SP207 to 311 are integrally coupled with the fasteners 225, 327, 229, and 231.

Figure 21:
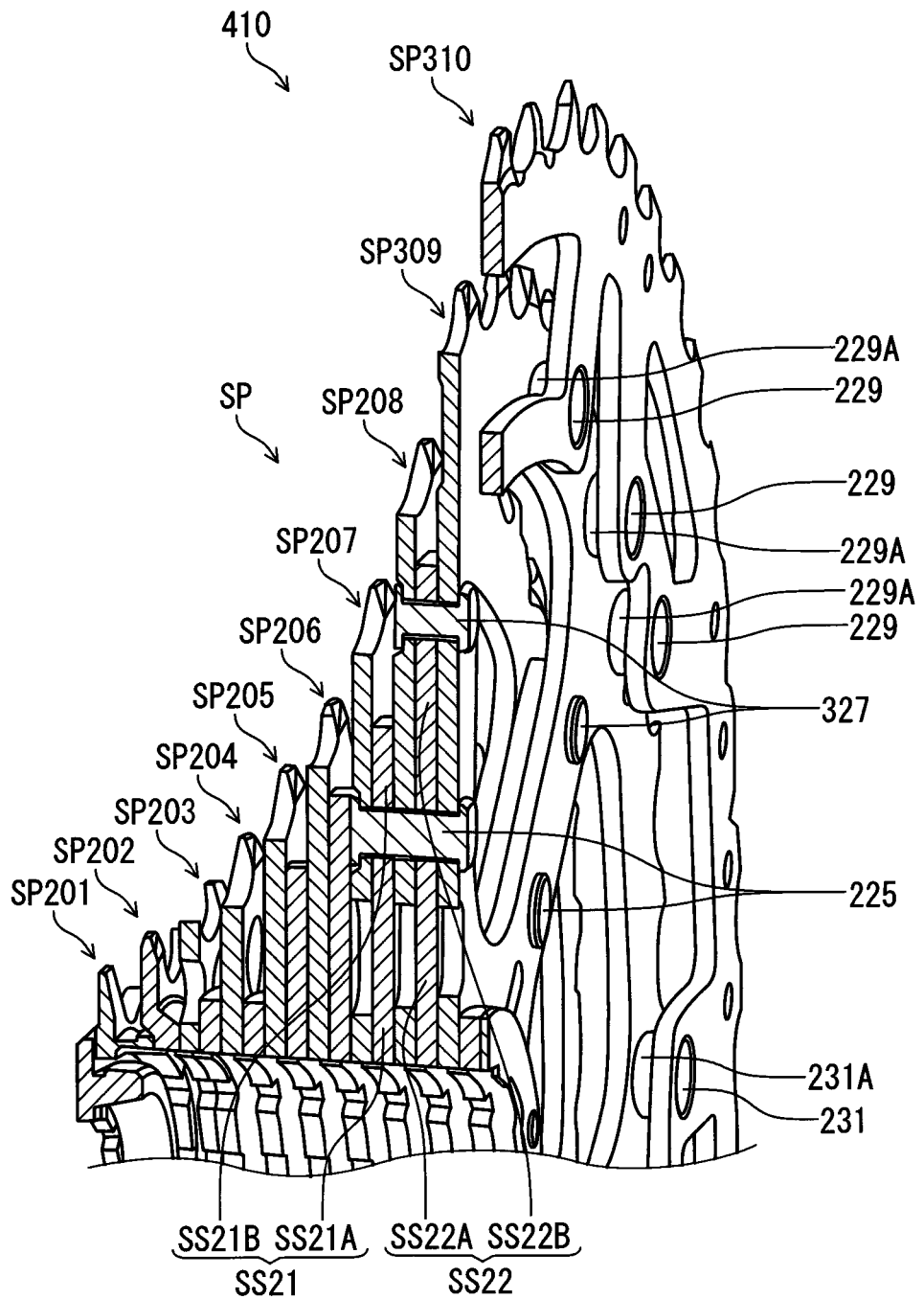
FIG. 21 is a perspective cross-sectional view of a rear sprocket assembly in accordance with another modification.

As seen in FIG. 21, the sprocket SP311 and the fasteners 231 of the rear sprocket assembly 310 are omitted from the rear sprocket assembly 410. The seventh to tenth sprockets SP207 to 310 are integrally coupled with the fasteners 225, 327, and 229.

In the above embodiment depicted in FIGS. 6 to 8, the rear sprocket assembly 10 includes the tooth-position maintaining member 32. As seen in FIGS. 22 to 25, however, the tooth-position maintaining member 32 can be omitted from the rear sprocket assembly 10 if needed and/or desired.

Figure 22:
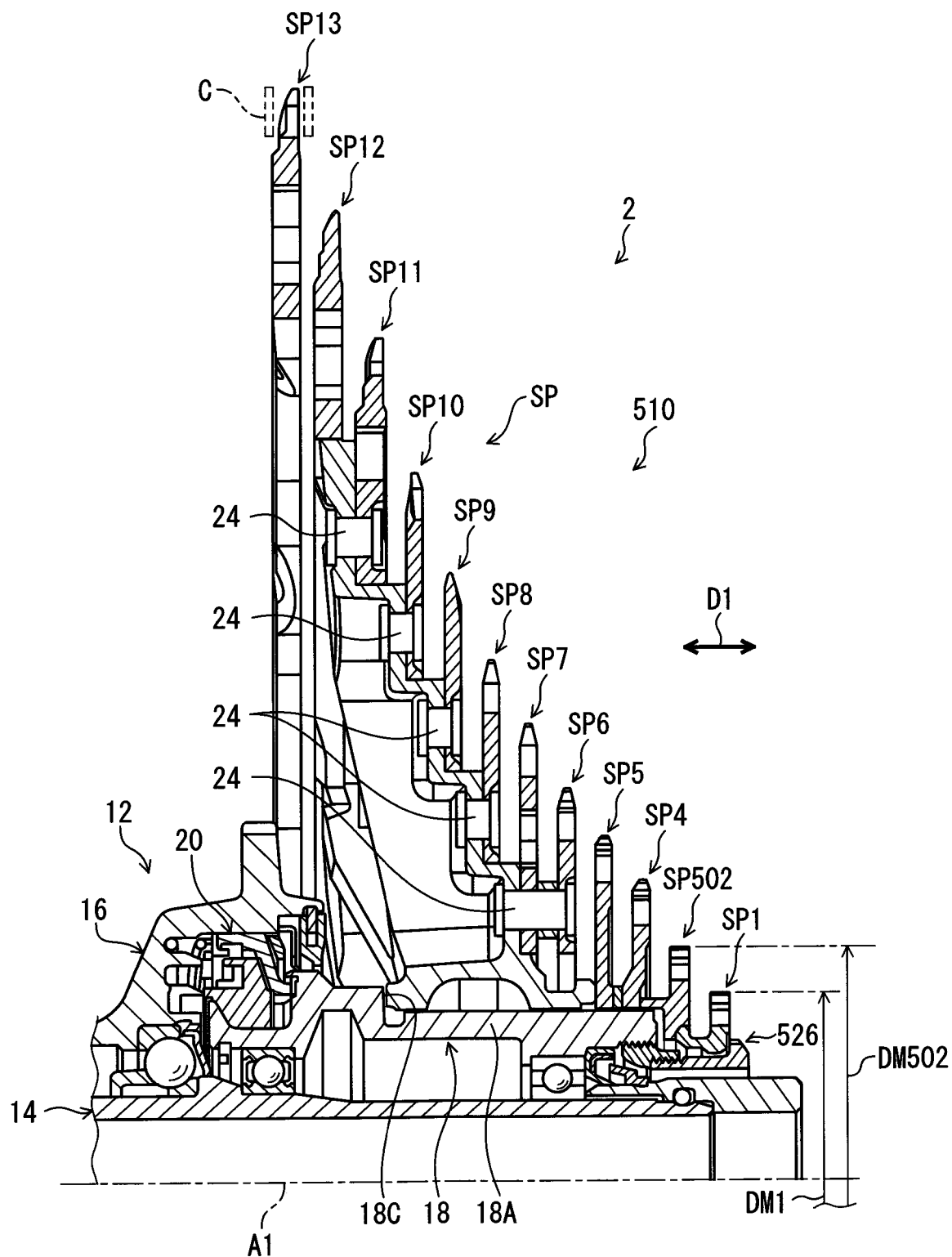
FIG. 22 is a cross-sectional view of a rear sprocket assembly in accordance with another modification with the rear hub assembly.

As seen in FIG. 22, a rear sprocket assembly 510 in accordance with a modification of the present embodiment is configured to be mounted to the rear hub assembly 12 for the human-powered vehicle 2. In the rear sprocket assembly 510, the plurality of rear sprockets SP includes the first, second, and fourth to thirteenth sprockets SP1, SP502, and SP4 to SP13. Namely, the rear sprocket assembly 510 comprises the first sprocket SP1. The rear sprocket assembly 510 further comprises the second sprocket SP502. The third sprocket SP3 is omitted from the plurality of sprockets SP. The thirteenth sprocket SP13 is added to the plurality of sprockets SP. However, the total number of the plurality of rear sprockets SP is not limited to twelve.

The second sprocket SP502 has substantially the same structure as the structure of the third sprocket SP3 of the rear sprocket assembly 10. The second sprocket SP502 has a second sprocket outer diameter DM502 larger than the first sprocket outer diameter DM1 of the first sprocket SP1.

The second sprocket SP502 is adjacent to the first or smallest sprocket SP1 without another sprocket between the adjacent sprocket and the first or smallest sprocket SP1 in the axial direction D1. The second sprocket SP502 can also be referred to as an adjacent sprocket SP502. Namely, in the rear sprocket assembly 510, the plurality of rear sprockets SP includes the adjacent sprocket SP502. The adjacent sprocket SP502 is adjacent to the smallest sprocket SP1 without another sprocket between the adjacent sprocket SP502 and the smallest sprocket SP1 in the axial direction D1.

Figure 23:
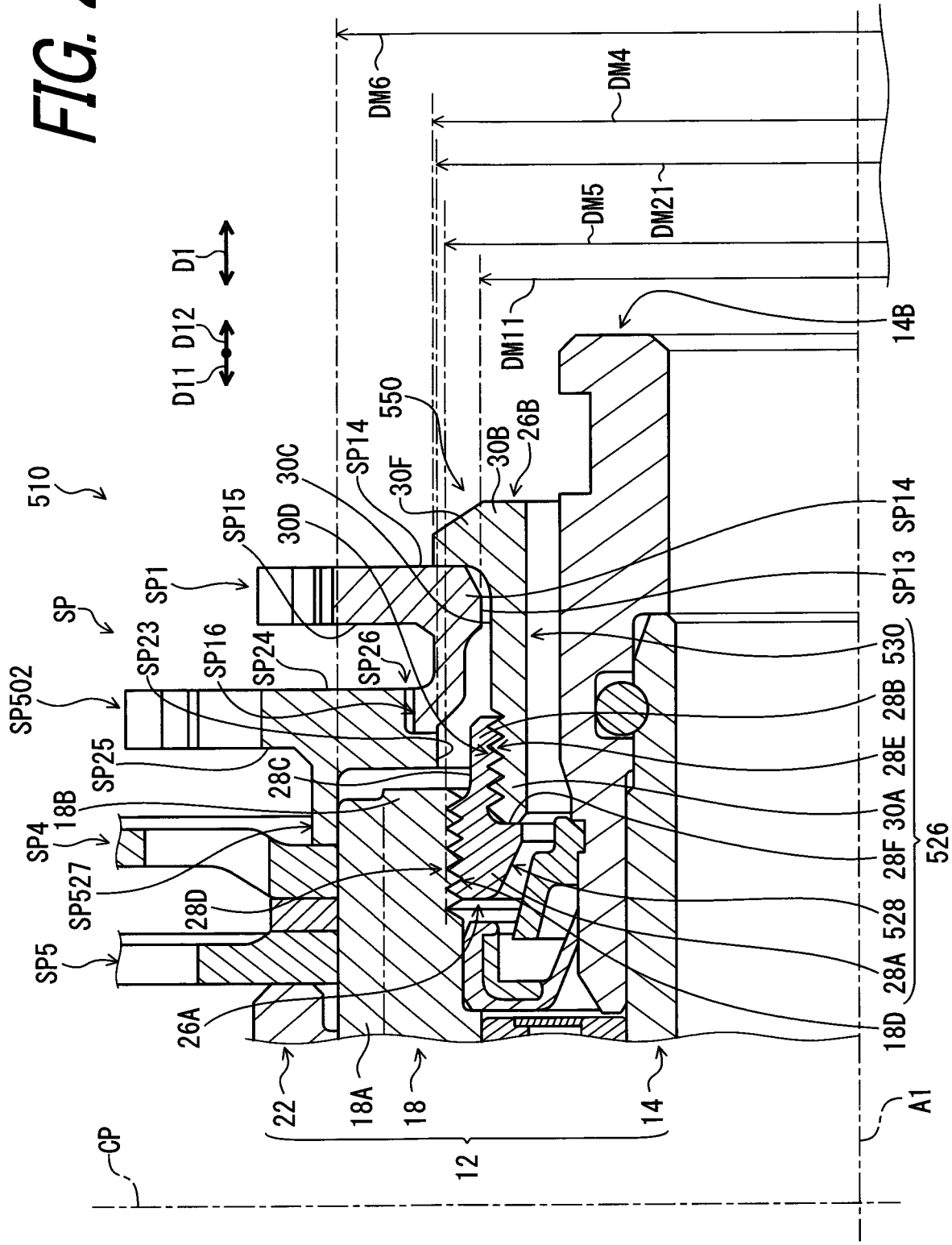
FIG. 23 is a partial cross-sectional view of the rear sprocket assembly and the rear hub assembly illustrated in FIG. 22.

As seen in FIG. 23, the rear sprocket assembly 510 comprises a lock device 526. The lock device 526 is configured to fix the rear sprocket assembly 510 to the sprocket support body 18 of the rear hub assembly 12 in a mounting state where the rear sprocket assembly 510 is mounted to the rear hub assembly 12. The lock device 526 is configured to mount the first sprocket SP1 to the rear hub assembly 12.

The lock device 526 has substantially the same structure as the structure of the lock device 26 of the rear sprocket assembly 10. The lock device 526 includes the axially inward end 26A and the axially outward end 26B. The axially outward end 26B is opposite to the axially inward end 26A in the axial direction D1.

As seen in FIG. 22, the lock device 526 is configured to be attached to the sprocket support body 18 to hold the sprocket carrier 22 and the first, second, fourth, and fifth sprockets SP1, SP502, SP4, and SP5 between the lock device 526 and the positioning surface 18C of the sprocket support body 18 in the axial direction D1.

Figure 24:
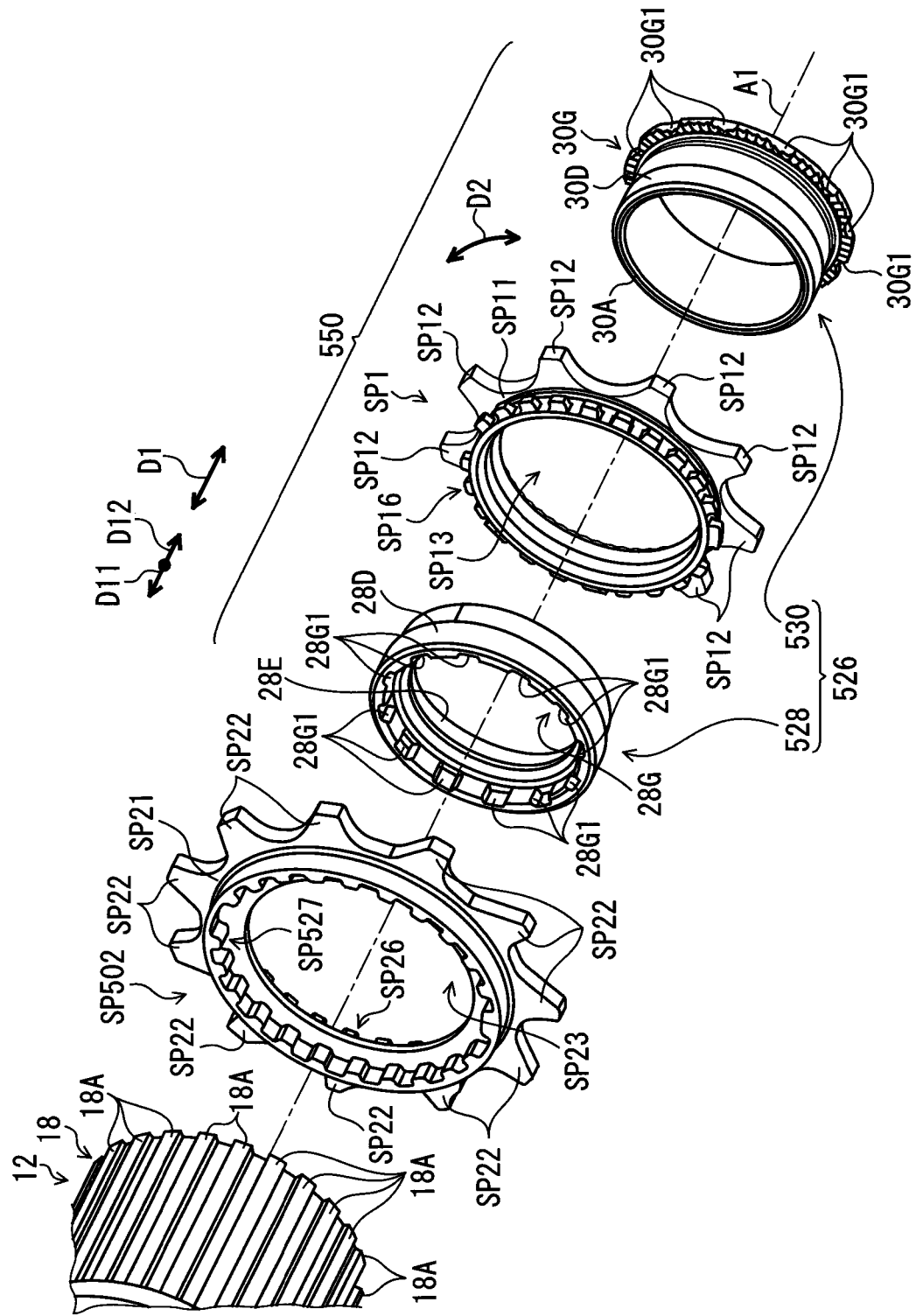
FIG. 24 is an exploded perspective view of a part of a lock device assembly of the rear sprocket assembly illustrated in FIG. 22.

As seen in FIG. 24, the second sprocket SP502 includes the second sprocket body SP21, the plurality of second sprocket teeth SP22, and the second sprocket opening SP23. The second sprocket SP502 has the second axially outward surface SP24 and the second axially inward surface SP25. The second axially outward surface SP24 and the second axially inward surface SP25 face toward opposite directions to each other in the axial direction D1. The second axially inward surface SP25 is configured to face toward the axial center plane CP of the human-powered vehicle 2 in the mounting state. The second sprocket SP502 includes the second axially outwardly torque transmitting profile SP26.

The first axially inwardly torque transmitting profile SP16 is configured to, in a torque-transmitting manner, engage with the second axially outwardly torque transmitting profile SP26 of the second sprocket SP502 adjacent to the first sprocket SP1 without another sprocket between the first sprocket SP1 and the second sprocket SP502 in the axial direction D1 in the mounting state where the rear sprocket assembly 510 is mounted to the rear hub assembly 12.

The second sprocket SP502 includes an additional torque transmitting profile SP527. The additional torque transmitting profile SP527 has substantially the same structure as the structure of the additional torque transmitting profile SP38 of the third sprocket SP3 of the first embodiment.

The additional torque transmitting profile SP527 is configured to engage with the plurality of external spline teeth 18A of the sprocket support body 18 in a torque transmitting manner. The additional torque transmitting profile SP527 and the plurality of external spline teeth 18A define a single circumferential position of the second sprocket SP502 relative to the sprocket support body 18. Rotational force is transmitted from the first sprocket SP1 to the sprocket support body 18 via the second sprocket SP502.

As seen in FIG. 23, the lock device 526 for mounting the plurality of rear sprockets SP to the rear hub assembly 12 for the human-powered vehicle 2 comprises a first lock member 528 and a second lock member 530. The first lock member 528 includes the axially inward end 26A. The second lock member 530 includes the axially outward end 26B. The first lock member 528 has substantially the same structure as the structure of the first lock member 28 of the first embodiment. The second lock member 530 has substantially the same structure as the structure of the second lock member 30 of the first embodiment.

The first lock member 528 is configured to detachably engage with the sprocket support body 18 of the rear hub assembly 12 in the mounting state. The second lock member 530 is configured to detachably engage with the first lock member 528 so as to abut against the first sprocket SP1 in the axial direction D1 in the mounting state. In this modification, the first lock member 528 is a separate member from the second lock member 530. However, the first lock member 528 can be integrally provided with the second lock member 530 as a one-piece unitary member if needed and/or desired.

The first lock member 528 is configured to detachably engage with the axial end 18B of the sprocket support body 18 in the mounting state. The first lock member 528 is configured to be at least partly provided in the second sprocket opening SP23 in the mounting state. The second lock member 530 is configured to be at least partly provided in the first sprocket opening SP13 and the second sprocket opening SP23 in the mounting state.

As seen in FIG. 23, the first lock member 528 includes the first axial end 28A and the second axial end 28B. The first lock member 528 includes the first surface 28C. The first axial end 28A has the first threads 28D. The second axial end 28B has the second threads 28E. The axially inward end 26A has the first threads 28D. The first lock member 528 has the axial contact surface 28F.

The second lock member 530 includes the third axial end 30A and the fourth axial end 30B. The second lock member 530 includes the second surface 30C. The third axial end 30A has the third threads 30D. The fourth axial end 30B has at least one radial projection 30F. The axially outward end 26B has the at least one radial projection 30F.

The lock device 526 is configured to dispose the first sprocket SP1 between the first threads 28D of the first lock member 528 and the at least one radial projection 30F of the second lock member 530 in the axial direction D1 in an assembled state where the first sprocket SP1 and the lock device 526 are assembled as one unit.

In the rear sprocket assembly 10 illustrated in FIG. 6, the major diameter DM5 of the first threads 28D is larger than the second diameter DM21 of the second sprocket opening SP23. In the rear sprocket assembly 510, however, the major diameter DM5 of the first threads 28D is smaller than the second diameter DM21 of the second sprocket opening SP23. Thus, the first lock member 528 can be inserted into the second sprocket opening SP23 of the second sprocket SP502 after the first lock member 528 and the second lock member 530 are assembled as one unit.

Figure 25:
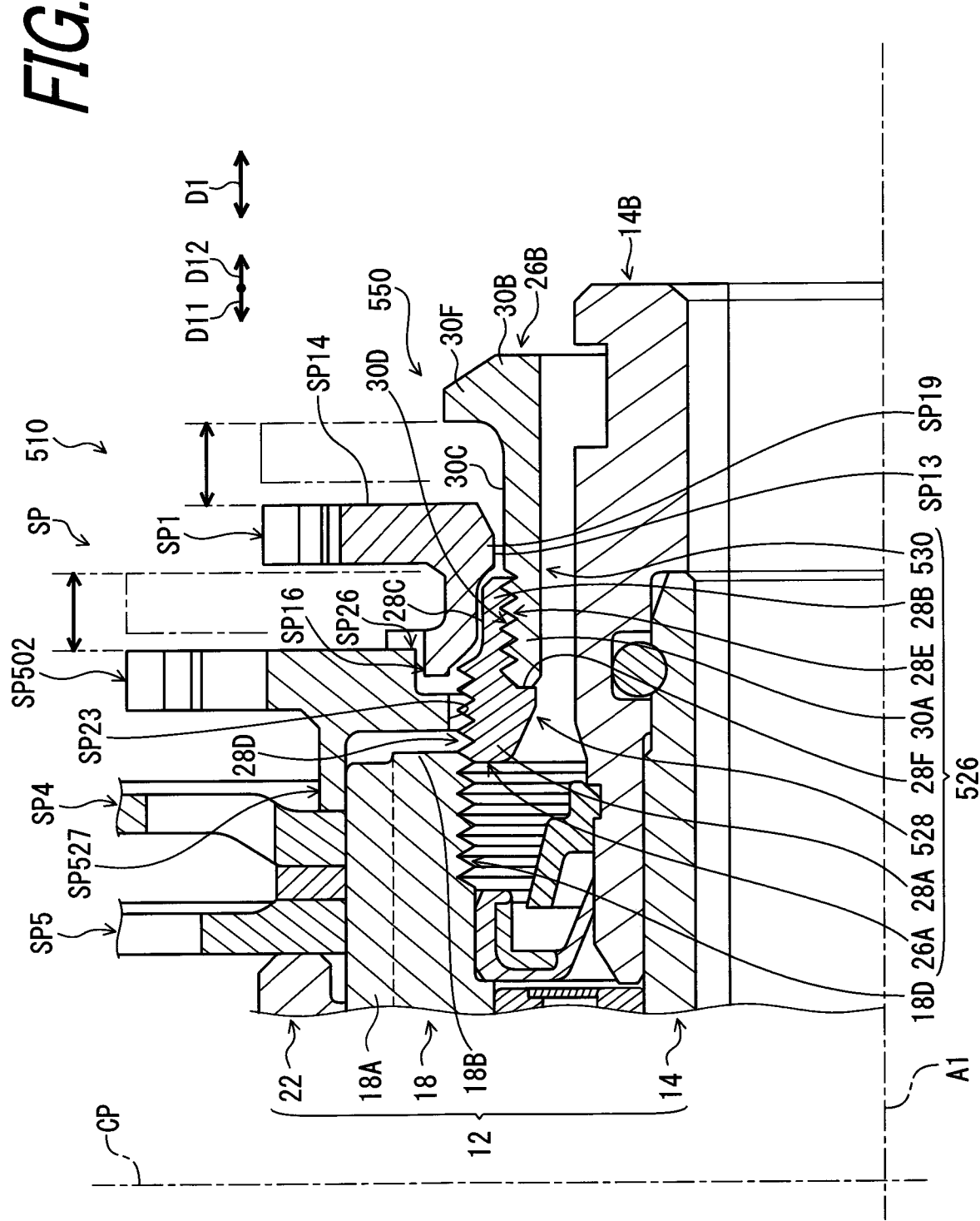
FIG. 25 is a partial cross-sectional view of the rear sprocket assembly and the rear hub assembly illustrated in FIG. 22.

As seen in FIG. 25, the first sprocket SP1 and the lock device 526 are assembled as a lock device assembly 550 before the first sprocket SP1 is assembled to the rear hub assembly 12. The lock device assembly 550 includes the first sprocket SP1 and the lock device 526. The lock device assembly 550 can include the second sprocket SP502 if needed and/or desired.

The lock device 526 is configured so that the first sprocket SP1 is slidable relative to the lock device 526 in the axial direction D1 in the assembled state and before the mounting state where the rear sprocket assembly 510 is mounted to the rear hub assembly 12. The lock device 526 is configured so that the adjacent sprocket SP502 is slidable relative to the lock device 526 above the first surface 28C and the second surface 30C in the axial direction D1 in the assembled state and before a mounting state where the plurality of rear sprockets SP is mounted to the rear hub assembly 12.

In this modification, the first sprocket SP1 is slidable between the first threads 28D of the first lock member 528 and the at least one radial projection 30F of the second lock member 530 in the axial direction D1 in the assembled state where the first sprocket SP1 and the lock device 526 are assembled as one unit. The first sprocket SP1 is slidable between the first threads 28D of the first lock member 528 and the at least one radial projection 30F of the second lock member 530 in the axial direction D1 in the assembled state before the mounting state where the rear sprocket assembly 510 is mounted to the rear hub assembly 12. However, the lock device 526 can be configured so that the smallest sprocket SP1 is static relative to the lock device 526 in the axial direction D1 in the assembled state if needed and/or desired. The lock device 526 can be configured so that the smallest sprocket SP1 is static relative to the lock device 526 in the axial direction D1 in the assembled state before the mounting state if needed and/or desired. In such embodiments, the lock device 526 is configured to restrict an axial movement of the first sprocket SP1 relative to the lock device 526 in both the first axial direction D11 and the second axial direction D12 in the assembled state before the mounting state. The at least one radial projection 30F of the second lock member 530 is in contact with the first sprocket SP1 to restrict an axial movement of the first sprocket SP1 relative to the lock device 526 in the second axial direction D12. The second axial end 28B of the first lock member 28 is in contact with the first sprocket SP1 to restrict an axial movement of the first sprocket SP1 relative to the lock device 526 in the first axial direction D11.

As seen in FIG. 24, to assemble the first sprocket SP1 and the lock device 526, the third axial end 30A of the second lock member 530 is inserted into the first sprocket opening SP13. The second external threads 30D of the second lock member 530 is screwed into the first internal threads 28E of the first lock member 528. The first lock member 528 and the second lock member 530 are rotated relative to each other using the first tool and the second tool until the third axial end 30A comes into contact with the axial contact surface 28F of the first lock member 528. Thus, the first sprocket SP1 and the lock device 26 are assembled as the lock device assembly 550.

As seen in FIG. 25, the additional torque transmitting profile SP527 of the second sprocket SP502 comes into engagement with the plurality of external spline teeth 18A of the sprocket support body 18. The first axial end 28A of the first lock member 528 is inserted into the second sprocket opening SP23 of the second sprocket SP502 in a state where the second sprocket SP502 is attached to the sprocket support body 18. The first axial end 28A of the first lock member 528 comes into contact and threadedly engage with the axial end 18B of the sprocket support body 18 in the assembled state where the first sprocket SP1 and the lock device 26 are assembled as the lock device assembly 550.

The first sprocket SP1 is moved toward the second sprocket SP502 to bring the first axially inwardly torque transmitting profile SP16 into engagement with the second axially outwardly torque transmitting profile SP26 of the second sprocket SP502. The first sprocket SP1 is rotated relative to the sprocket support body 18 about the rotational center axis A1 to adjust the rotational position of the first axially inwardly torque transmitting profile SP16 relative to the second axially outwardly torque transmitting profile SP26 of the second sprocket SP502 in a circumferential direction D2 with respect to the rotational center axis A1.

The lock device 526 is rotated relative to the sprocket support body 18 about the rotational center axis A1 using the second tool such that the first external threads 28D of the first lock member 528 is screwed into the internal threads 18D of the sprocket support body 18. The rotational position between the first sprocket SP1 and the second sprocket SP502 is maintained relative to the sprocket support body 18 while the lock device 526 is rotated relative to the sprocket support body 18 since the first axially inwardly torque transmitting profile SP16 of the first sprocket SP1 is engaged with the second axially outwardly torque transmitting profile SP26 of the second sprocket SP502. The first sprocket SP1 and the second sprocket SP502 are held between the radial projection 30F and the third sprocket SP3 in the axial direction D1 when the lock device 526 is tightened using the tool. Thus, the first sprocket SP1 and the second sprocket SP502 are mounted to the sprocket support body 18 of the rear hub assembly 12 using the lock device 526.

The rear sprocket assembly 510 can include the tooth-position maintaining member 32 of the rear sprocket assembly 10 if needed and/or desired.

In the rear sprocket assembly 10 or 510, the third threads 30D are configured to threadedly engage with the second threads 28E in the assembled state. However, the third axial end 30A of the second lock member 30 or 530 may be attached to the second axial end 28B of the first lock member 28 or 528 via other structures such as spline engagement in a press-fitted manner.

Figure 26:
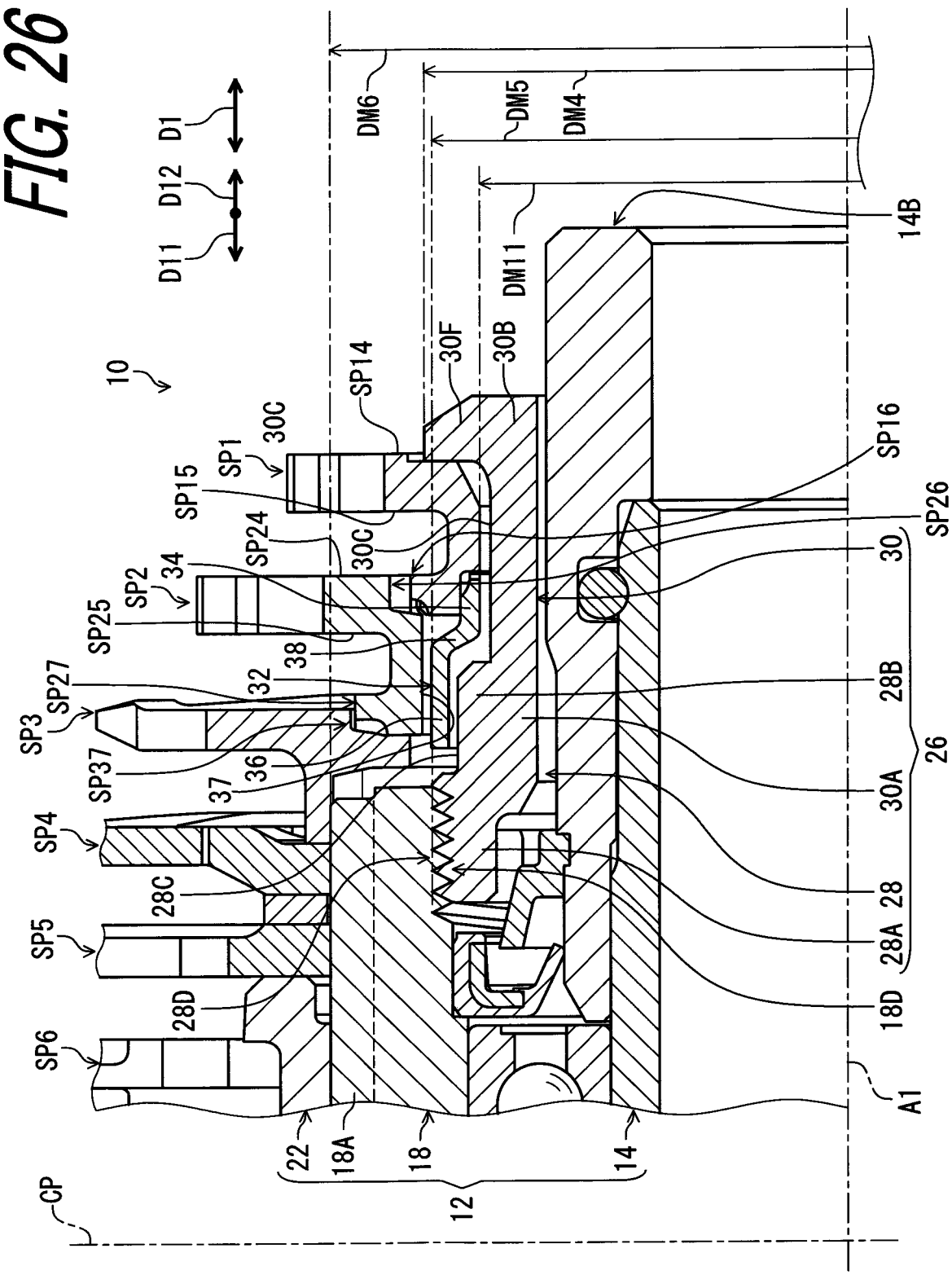
FIG. 26 is a partial cross-sectional view of a rear sprocket assembly in accordance with another modification of the embodiment illustrated in FIG. 3.
Figure 27:
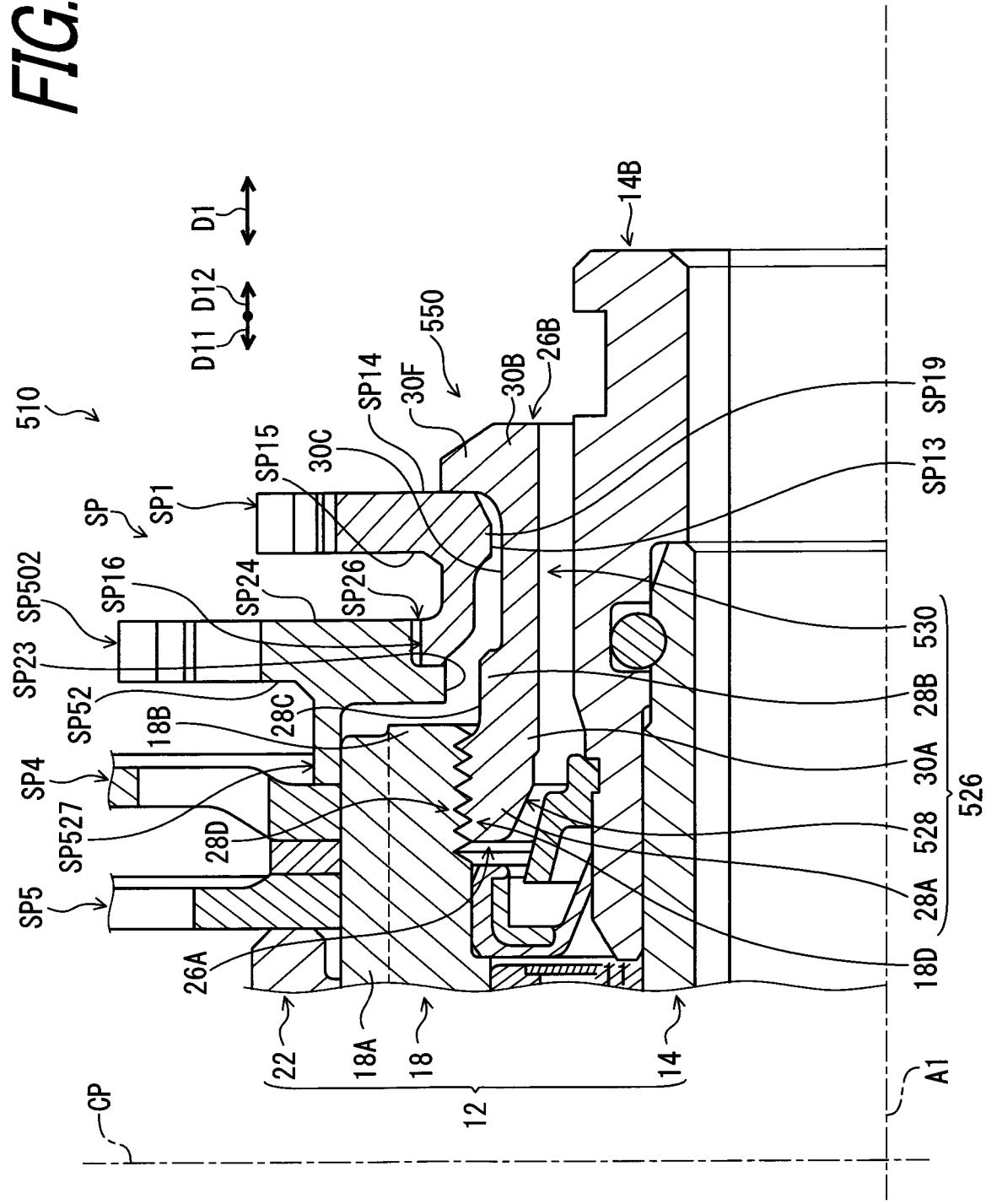
FIG. 27 is a partial cross-sectional view of a rear sprocket assembly in accordance with another modification of the embodiment illustrated in FIG. 22.

In the rear sprocket assembly 10 illustrated in FIG. 6, the first lock member 28 is a separate member from the second lock member 30. In the rear sprocket assembly 510 illustrated in FIG. 23, the first lock member 528 is a separate member from the second lock member 530. As seen in FIG. 26 or 27, however, the lock device 26 or 526 can be a one-piece, unitary member.

In the modification depicted in FIG. 26, the first lock member 28 is integrally provided with the second lock member 30 as a one-piece unitary member. The at least one radial projection 30F of the lock device 26 can be formed by material deformation. The at least one radial projection 30F of the lock device 26 is formed by material deformation in a state where the first sprocket SP1, the second sprocket SP2, and the tooth-position maintaining member 32 are provided radially outwardly of the first surface 28C and the second surface 30C. For example, the at least one radial projection 30F of the lock device 26 is formed by press working in the state where the first sprocket SP1, the second sprocket SP2, and the tooth-position maintaining member 32 are provided radially outwardly of the first surface 28C and the second surface 30C.

In the modification depicted in FIG. 27, the first lock member 528 is integrally provided with the second lock member 530 as a one-piece unitary member. The at least one radial projection 30F of the lock device 526 can be formed by material deformation. The at least one radial projection 30F of the lock device 526 is formed by material deformation in a state where the first sprocket SP1 is provided radially outwardly of the first surface 28C and the second surface 30C. For example, the at least one radial projection 30F of the lock device 526 is formed by press working in the state where the first sprocket SP1 is provided radially outwardly of the first surface 28C and the second surface 30C.

Each of the structures of the rear sprocket assemblies 210, 310, and 410 illustrated in FIGS. 19 to 21 can be applied to the rear sprocket assembly 510, the modification of the rear sprocket assembly 10 depicted in FIG. 26, and the modification of the rear sprocket assembly 510 depicted in FIG. 27 if needed and/or desired.

In the present application. the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element"

itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A rear sprocket assembly configured to be mounted to a rear hub assembly for a human-powered vehicle, the rear sprocket assembly comprising:
    a first sprocket being a smallest sprocket in the rear sprocket assembly and including:
        a first sprocket body;
        a plurality of first sprocket teeth extending radially outwardly from the first sprocket body in a radial direction with respect to a rotational center axis of the rear sprocket assembly; and
        a first sprocket opening configured to receive a hub axle of the rear hub assembly in a mounting state where the rear sprocket assembly is mounted to the rear hub assembly, the first sprocket opening having a first radially minimum diameter that is smaller than an outermost diameter of a sprocket support body of the rear hub assembly; and
    a lock device configured to fix the rear sprocket assembly to the sprocket support body of the rear hub assembly in the mounting state and including:
        a first lock member including:
            a first axial end configured to be detachably attached to the sprocket support body of the rear hub assembly in the mounting state, and
            a second axial end opposite to the first axial end in an axial direction with respect to the rotational center axis; and
        a second lock member including:
            a third axial end configured to be attached to the second axial end of the first lock member in an assembled state where the first sprocket and the lock device are assembled as one unit; and
            a fourth axial end opposite to the third axial end in the axial direction and having at least one radial projection configured to abut against the first sprocket in the axial direction in the mounting state, and
    the lock device being configured so that the first sprocket is slidable relative to the lock device in the axial direction in the assembled state and before the mounting state.

2. The rear sprocket assembly according to claim 1, wherein
    the first axial end has first threads configured to threadedly engage with threads provided to the sprocket support body of the rear hub assembly in the mounting state.

3. The rear sprocket assembly according to claim 2, wherein
    the second axial end has second threads, and
    the third axial end has third threads configured to threadedly engage with the second threads of the first lock member in the assembled state.

4. The rear sprocket assembly according to claim 3, wherein
    the first lock member includes a first surface radially outwardly facing in the radial direction,
    the first surface is adjacent to the first threads,
    the second lock member includes a second surface radially outwardly facing in the radial direction,
    the second surface is adjacent to the third threads, and
    the first surface is disposed radially outwardly from the second surface in the radial direction in the assembled state.

5. The rear sprocket assembly according to claim 4, wherein
    the second surface is disposed between the third threads and the at least one radial projection.

6. The rear sprocket assembly according to claim 5, wherein
    the first threads of the first lock member extend radially outwardly from the first surface in the radial direction,
    the first threads have a first radially maximum thread diameter,
    the at least one radial projection of the second lock member extending radially outwardly from the second surface in the radial direction,
    the at least one radial projection has a radially maximum projection diameter, and
    the first radially minimum diameter of the first sprocket opening is smaller than each of the first radially maximum thread diameter of the first threads and the radially maximum projection diameter of the at least one radial projection.

7. The rear sprocket assembly according to claim 4, wherein
    the first sprocket has a first radially minimum portion defining the first radially minimum diameter of the first sprocket opening, and
    the first radially minimum portion of the first sprocket is disposed radially outwardly of the second surface in the assembled state.

8. The rear sprocket assembly according to claim 2, wherein the first sprocket is slidable between the first threads of the first lock member and the at least one radial projection of the second lock member in the axial direction in the assembled state.

9. The rear sprocket assembly according to claim 1, wherein
the first axial end of the first lock member includes a first tool engagement profile, and
the fourth axial end of the second lock member includes a second tool engagement profile.

10. The rear sprocket assembly according to claim 2, wherein
the lock device is configured to dispose the first sprocket between the first threads of the first lock member and the at least one radial projection of the second lock member in the axial direction in the assembled state.

11. The rear sprocket assembly according to claim 1, wherein
the first lock member has an axial contact surface, and
the axial contact surface is configured to contact the third axial end of the second lock member in the assembled state.

12. The rear sprocket assembly according to claim 1, wherein
the first sprocket has a first axially outward surface and a first axially inward surface,
the first axially outward surface and the first axially inward surface face toward opposite directions to each other in the axial direction,
the first axially inward surface is configured to face toward an axial center plane of the human-powered vehicle in the mounting state,
the first sprocket includes a first axially inwardly torque transmitting profile provided to the first axially inward surface, and
the first axially inwardly torque transmitting profile is configured to, in a torque-transmitting manner, engage with a second axially outwardly torque transmitting profile of a second sprocket adjacent to the first sprocket without another sprocket between the first sprocket and the second sprocket in the axial direction in the mounting state.

13. The rear sprocket assembly according to claim 1, wherein
the third axial end of the second lock member is configured to be detachably attached to the second axial end of the first lock member in the assembled state.

14. A rear sprocket assembly configured to be mounted to a rear hub assembly for a human-powered vehicle, the rear sprocket assembly comprising:
a first sprocket being a smallest sprocket in the rear sprocket assembly and including:
a first sprocket body;
a plurality of first sprocket teeth extending radially outwardly from the first sprocket body in a radial direction with respect to a rotational center axis of the rear sprocket assembly; and
a first sprocket opening configured to receive a hub axle of the rear hub assembly in a mounting state where the rear sprocket assembly is mounted to the rear hub assembly, the first sprocket opening having a first radially minimum diameter that is smaller than an outermost diameter of a sprocket support body of the rear hub assembly; and
a lock device configured to fix the rear sprocket assembly to the sprocket support body of the rear hub assembly in the mounting state and including:
an axially inward end having first threads configured to threadedly engage with threads provided to the sprocket support body of the rear hub assembly in the mounting state, the first threads having a first radially maximum thread diameter; and
an axially outward end opposite to the axially inward end in the axial direction and having at least one radial projection configured to abut against the first sprocket in the axial direction in the mounting state, the at least one radial projection having a radially maximum projection diameter,
the first radially minimum diameter of the first sprocket opening being smaller than each of the first radially maximum thread diameter of the first threads and the radially maximum projection diameter of the at least one radial projection, and
the lock device being configured so that the first sprocket is slidable relative to the lock device in the axial direction in the assembled state and before the mounting state.

15. The rear sprocket assembly according to claim 14, wherein
the lock device is a one-piece, unitary member.

16. The rear sprocket assembly according to claim 15, wherein
the at least one radial projection of the lock device is formed by material deformation.

17. A lock device for mounting a plurality of rear sprockets to a rear hub assembly for a human-powered vehicle, the lock device comprising:
a first lock member including:
a first axial end configured to be detachably attached to the sprocket support body of the rear hub assembly in a mounting state where the plurality of rear sprockets is mounted to the rear hub assembly;
a second axial end opposite to the first axial end in an axial direction with respect to a rotational center axis of the plurality of rear sprockets; and
a first surface radially outwardly facing in a radial direction with respect to the rotational center axis; and
a second lock member including:
a third axial end configured to be attached to the second axial end of the first lock member in an assembled state where a smallest sprocket and the lock device are assembled as one unit;
a fourth axial end opposite to the third axial end in the axial direction and having at least one radial projection; and
a second surface radially outwardly facing in the radial direction, the second surface being adjacent to the at least one radial projection in the axial direction,
the at least one radial projection of the second lock member extending radially outwardly from the second surface in the radial direction and being configured to abut against the smallest sprocket of the plurality of rear sprockets in the axial direction in the mounting state,
the first surface being disposed radially outwardly from the second surface in the radial direction in the assembled state,
the plurality of rear sprockets including an adjacent sprocket adjacent to the smallest sprocket without another sprocket between the adjacent sprocket and the smallest sprocket in the axial direction, and
the lock device being configured so that the adjacent sprocket is slidable in the axial direction relative to the lock device in a space provided radially outwardly of the first surface and the second surface in the assembled state and before the mounting state.

18. The lock device according to claim 17, wherein the lock device is configured so that the smallest sprocket is static relative to the lock device in the axial direction in the assembled state.

19. The lock device according to claim 17, wherein the first axial end has first threads configured to threadedly engage with threads provided to a sprocket support body of the rear hub assembly in the mounting state.

20. The lock device according to claim 17, wherein the third axial end of the second lock member is configured to be detachably attached to the second axial end of the first lock member in the assembled state.

* * * * *